(12) United States Patent
Salafia et al.

(10) Patent No.: US 7,978,826 B2
(45) Date of Patent: Jul. 12, 2011

(54) RESPONSE ADVISOR FOR A CALL HANDLING SYSTEM

(76) Inventors: Christopher Michael Salafia, Killingworth, CT (US); Jeremy Edward Turk, Guilford, CT (US); Philip M Salafia, Old Lyme, CT (US)

( * ) Notice: Subject to any disclaimer, the term of this patent is extended or adjusted under 35 U.S.C. 154(b) by 1066 days.

(21) Appl. No.: 11/733,869

(22) Filed: Apr. 11, 2007

(65) Prior Publication Data

US 2007/0189480 A1    Aug. 16, 2007

Related U.S. Application Data

(63) Continuation-in-part of application No. 10/913,880, filed on Aug. 6, 2004, now Pat. No. 7,515,693.

(60) Provisional application No. 60/744,618, filed on Apr. 11, 2006, provisional application No. 60/744,620, filed on Apr. 11, 2006.

(51) Int. Cl.
*H04M 11/00* (2006.01)

(52) U.S. Cl. ......... 379/37; 379/42; 379/45; 379/201.01; 379/201.03

(58) Field of Classification Search ............... 379/37–49; 340/505, 539.1, 539.13, 540, 5.61, 825.09, 340/573.1; 707/10; 705/8, 1, 9; 600/300, 301, 486

See application file for complete search history.

(56) References Cited

U.S. PATENT DOCUMENTS

| | | | |
|---|---|---|---|
| 2002/0004729 A1* | 1/2002 | Zak et al. | 705/3 |
| 2004/0085218 A1* | 5/2004 | Pecora | 340/815.4 |
| 2004/0107125 A1* | 6/2004 | Guheen et al. | 705/7 |
| 2004/0139175 A1* | 7/2004 | Lin | 709/220 |
| 2007/0055559 A1* | 3/2007 | Clawson | 705/8 |

\* cited by examiner

*Primary Examiner* — Melur Ramakrishnaiah
(74) *Attorney, Agent, or Firm* — Maier & Maier, PLLC

(57) ABSTRACT

Systems and methods are presented for handling calls. In one embodiment of the invention, a call handling system is configured for handling a variety of emergency and/or non emergency related calls. The call handling system may enable recognition of and response to received call information. The call handling system comprises a call interface configured for receiving the call information. A processor is communicatively coupled to the call interface and configured for processing the call information to initiate a protocol. This protocol may, as it progresses, be used to generate data for use in a CAD system. The CAD system may subsequently dispatch responders based on the generated data. The call handling system includes an advisory component that recommends a type of dispatch and a risk assessment. The call handling system also includes a build component that allows for the generation of protocols.

22 Claims, 20 Drawing Sheets

| | CHIEF COMPLAINT 400 | | | | |
|---|---|---|---|---|---|
| | INITIAL SURVEY 401 | EMERGENCY INDICATIONS 402 403 | PRIMARY QUESTIONS | SECONDARY QUESTIONS 404 | DISPATCH/ INSTRUCT 405 |
| | CALL INFORMATION (e.g., PHONE NUMBER) | IMMEDIATE ATTENTION CONDITIONS (e.g., LIFE THREATENING CONDITIONS, FIRE EMERGENCY CONDITIONS, et cetera) | CONDITION CLARIFICATION | SITUATION CONDITIONS | PRE ARRIVAL INSTRUCTIONS |
| | PARTY TYPE (e.g., 1st, 2nd, 3rd, et cetera) | | CRITICAL ACTION | SITUATION ADVICE | UPDATE(S) |
| | INITIAL CONDITIONS | | | | POST ARRIVAL INSTRUCTIONS |
| | | | ... | ... | CALLER INSTRUCTIONS |
| | ... | ... | | | ... |
| | CUSTOMIZABLE | CUSTOMIZABLE | CUSTOMIZABLE | CUSTOMIZABLE | CUSTOMIZABLE |

Maintain Responder

Responder Types: Medical

Responder Skill-Level:
BLS
ALS
EMS

Responder Skill-Level: BLS
Phone Number: (203) 245-8911
Fax Number: (   )   -
Email Address:
Township Location:
Township Address: 1321 Boston Post Rd
Primary Contact:

Add   Remove

OK   Cancel

RESPONSE ADVISOR FOR A CALL HANDLING SYSTEM

CROSS REFERENCE TO RELATED APPLICATIONS

This patent application claims priority to and, thus, the benefit of an earlier filing date from U.S. Provisional Patent Application No. 60/744,618 (filed Apr. 11, 2006) and U.S. Provisional Patent Application No. 60/744,620 (filed Apr. 11, 2006), the entire contents of each are hereby incorporated within by reference. This patent application is also a continuation-in-part patent application of co pending and commonly owned U.S. patent application Ser. No. 10/913,880 (filed Aug. 6, 2004), the entire contents of which are hereby incorporated within by reference.

BACKGROUND

Call handling of either emergency or non-emergency related situations is a process of interacting with a caller to exchange information. The caller may have contacted a particular agency or service provider to gain assistance. For example, a caller may dial 911 seeking emergency assistance. Another example is where a caller dials an information service to obtain driving directions or addresses.

A particular caller may contact a particular agency or service provider to forward information. For example, a caller may dial 911 to report an emergency situation that the caller has witnessed, such as a crime, an automobile accident or a building fire. An example of a non-emergency situation would be where the caller calls to report local driving or weather conditions or a crime tip line. Whether the caller is calling to gain assistance or report information, a call handler, who may be specially trained in quickly and efficiently exchanging information with a caller, may handle the call.

A critical application of call handling is in the provision of emergency services. In an emergency situation, the call handler may need to quickly extract information from the caller in order to assist the caller. Such is typically the case in emergency medical situations where the call handler must ascertain the type and extent of injury in order to give relevant instructions. Generally, in an emergency situation, a caller will dial 911 and be connected to a local Public Safety Answering Point (PSAP). The PSAP is generally staffed with a group of specially trained call handlers. Typically, the call handlers will respond to callers according to protocols, often dispatching emergency service providers. Call handling is often employed with Computer Aided Dispatch ("CAD") systems that dispatch response units, such as police, fire and/or medical units, based on received information.

Additionally, a call handler working in a PSAP may receive textual information, displayed on a computer terminal, regarding the probable location of a caller. If the caller is calling from a landline, systems at the PSAP may access an automatic location information (ALI) database to determine the location of the caller. Accordingly, errors in the ALI database may result in incorrect determinations of caller location. Therefore, the call handler may need to verify the location of the caller. If the caller is calling from a mobile wireless device (e.g., cell phone), location information, if available at all, may not be determinable in the same manner as for landlines. For example, location information of a caller using a mobile wireless device presented to a call handler may be derived from triangulating signals transmitted by the cell phone, not by means of a database as in line calls. The accuracy of such a location may be dependent on the number of cell towers and signal strength. Global Positioning System (GPS) location data may also be available if the caller is using a cell phone with GPS capabilities. However, GPS systems may be unreliable, for example, if the caller is indoors. Accordingly, in the case of mobile wireless devices, the call handler may need to provide and/or verify the location of the caller.

Generally, the location of the caller is only one part of the information that is exchanged between the caller and the call handler in an emergency situation. For example, at the scene of a major traffic accident, the caller may need to communicate the number of people injured, the number of vehicles involved, location and condition of the vehicles, current conditions (e.g., fog, ice, etc.), and many other aspects of the situation. In current emergency call handling systems, all of this information is communicated verbally between the caller and the call handler and the call handler may forward this information to an emergency services provider.

SUMMARY

The systems and methods described herein provide for call handling. For example, a call handling system may receive a telephone call from a caller requiring assistance. Because handling system may direct a user of the call handling system to provide the required assistance to the caller. A common example of such includes the provision of emergency services, such as fire, police, and/or emergency medical services. In this regard, a call handler system user may receive a call from a caller in distress. The call handler system may direct the user to provide assistance and/or instructions relating to the caller situation.

Additional features provide for a module that builds protocols used in instructing and/or assisting the caller. In this regard, the call handler user may build a protocol and test that protocol as if it were applied to an actual caller scenario. Another feature of the call handler system is a responsive adviser component. The responsive adviser responds to information received by the call handler user as conveyed by the caller. The call handler user would input this information into the call handler system. Based on keywords, for example, the response adviser would recommend types of responses for the caller and, provide dispatch information to that end.

In one embodiment, a call handler system includes a call handler interface that is configured for receiving call information from a caller and an advisory component communicatively coupled to the call handler interface to detect an event from the call information and generate one or more relative importance indicators based on at least a portion of the call information. The advisory component provides the one or more relative importance indicators to a user of the call handling system via call handler interface. The advisory component may further provide a selection input to the user for accepting, refusing or amending the relative importance indicator. The relative importance indicator may include a risk assessment of a situation pertaining to the caller. Alternatively or additionally, the relative importance indicator includes a homeland security indicator.

The call handling system may include a rules processing engine that provides a protocol to direct the user in assisting the caller with a situation pertaining to the caller. The protocol may include at least one activity trigger used in initiating the advisory component. The advisory component may be further configured for receiving input from the user to change a response type. The advisory component may be communicatively coupled to the rules processing engine to provide activity triggering information to the rules processing engine. In this regard, the rules processing engine processes the activity triggering information to initiate another protocol.

The protocol may include one or more script modules, wherein each script module is relevant to a unique caller situation. Each of the one or more script modules may include one or more script elements, wherein the script elements include questions, statements, or procedures.

Additionally or alternatively, the call handler system may include a build component that generates one or more script modules. In this regard, the build component may include a test element configured for testing the generated one or more script modules. For example, the test element may test the generated one or more script modules by deploying a script module for operation within the call handling system while decoupling the call handling system from external computer aided dispatch systems. The build component also include a publication component that provides accessibility to a generated script module by the call handling system. The publication component may provide version control of a generated script module. For example, the build component may be configured for migrating the version control of a generated script module to at least one other script module. The version control of the generated script module may also prevent inadvertent access to a previous version of a generated script module.

In another embodiment, a call handling system includes a call handler interface for receiving information from a caller and a build component that enables modular configuration of rules relating to handling of received calls to generate one or more protocols. The one or more protocols direct a call handler to respond to a caller, wherein the rules include information for generating one or more protocol modules for each of the one or more protocols. Each protocol module may be configured for a situation pertaining to a caller. Each protocol module may include one or more script elements relevant to the caller situation, wherein a script element includes a statement, a question, or a procedure.

The call handling system may further include the call handling system may further include a rules processing engine that processes the rules to generate the one or more protocols. The rules processing engine may include a bridge component that initiates a first of the one or more protocols based on a response to an initiated protocol.

The build component may be further configured for generating one or more activity triggers within the one or more protocols, wherein the one or more activity triggers include links to other protocols based on responses from a caller. Additionally or alternatively, the build component may be configured for generating one or more activity triggers within the one or more protocols, wherein the one or more activity triggers initiate an advisory component of the call handling system based on responses from a caller.

The build component may include a test element configured for testing the generated one or more script modules. For example, the test element may test the generated one or more script modules by deploying a script module for operation within the call handling system while decoupling the call handling system from external computer aided dispatch systems. The build component may also include a publication component that provides accessibility to a generated script module by the call handling system. The publication component may provide version control of a generated script module. The build component may be configured for migrating the version control of a generated script module to at least one other script module. The version control of the generated script module may prevent inadvertent access to a previous version of a generated script module.

In another embodiment, a call handling system includes a call handler interface component for receiving call information. The call handling interface component includes a storage unit configured for storing one or more protocols used in directing a call handler to respond to a caller and a processor for processing the call information and populating a database with one or more terms based on the call information. The one or more terms are cross referenced to the stored protocols to initiate at least one of the stored protocols. The system also includes a build component that configures rules that are input via the call handler interface to generate the one or more protocols, wherein the rules include advisory information and a relative importance of a protocol module and wherein a generated protocol has one or more modules configured from the rules.

The call handling interface component may further include a bridge element for initiating a second of the stored protocols. In this regard, the bridge element may operable emerge at least two of the stored protocols to generate a merged protocol. The bridge element may include a detector that detects an event based on processed call information to initiate the second of the stored protocols.

In one embodiment, a method of providing assistance to a caller includes processing first information, with a computer aided call handling system, from a caller. The first information is determined based on a first response from the caller. The method also includes initiating a first protocol based on the first information. The first protocol is configured for providing second information to the caller. The method also includes initiating an advisory component of the call handling system. The advisory component provides a recommended response according to the first protocol. The method also includes providing the recommended response to a call handling system user for selection of the recommended response. For example, the advisory component may recommend a particular type of dispatch and/or instruction for the call handling system user to convey to the caller. In this regard, because handling system user may select the recommended dispatch and/or instruction to assist the caller or disregard such if the call handling system user deems the recommendation to be non-applicable. However, the advisory component may be "hard configured" to automatically provide a recommended dispatch or instruction such that the call handling system user does not have a selection option.

The method may further include providing a dispatch recommendation to either or both of the call handling system user and a computer-aided dispatch system. The method may further include providing at least one of a statement, a question, and an instruction upon initiation of the first protocol. For example, the method may further include processing third information based on a second response of the caller, wherein the third information is determined from said at least one of the statement, the question, and the instruction. The method may further include updating the recommended response based on the third information. Alternatively or additionally, the method may include initiating a bridge element based on the third information to initiate a second protocol. For example, third information may be a keyword. The method may also include processing the first information includes extracting data from a user interface that includes one or more of: a drop-down menu, a free text entry field, and a keyword selection menu.

In another embodiment, a method of generating a protocol module for use in a call handling system includes providing a protocol framework, receiving first information relevant to a first portion of a call handling system scenario. The method also includes processing the first information to generate a first protocol module and formatting the first protocol module within the protocol framework.

Processing the first information may include generating an activity trigger for initiating an advisory component upon initiation of the first protocol module and formatting the activity trigger within the first protocol module.

The method may further include receiving second information relevant to a second portion of the call handling system scenario, processing the second information to generate a second protocol module, and formatting the second protocol module within the protocol framework. In this regard, the method may further include compiling the first protocol module and the second protocol module within the protocol framework to generate a first protocol. For example, the protocol may include one or more modules relevant to a particular call handling system scenario, such as police, fire, and emergency medical services etc. The modules themselves may further include statements used in eliciting information from a caller. Once this information is input and the modules are configured, the modules may be used to generate a protocol for use by the call handling system. Any protocol may be configured from existing modules are newly generated modules. Additionally, a protocol may be compiled from a single module. The method may also include generating an indicator reception within the first protocol module for initiating a preconfigured protocol. For example, the first protocol may be configured with a link to a second protocol to initiate the second protocol upon detection of a keyword, or the like, by the bridge element of the call handling system.

The method may further include testing the first protocol to determine operability of the first protocol. In this regard, testing the first protocol includes providing the call handling system with test data relevant to the call handling system scenario and decoupling external systems in communication with the call handling system. For example, the first protocol may be "run" within the call handling system using stored call handling data (e.g., either generated or archived based on actual call scenarios). The call handling system itself may operate as though the call handling system scenario were real. However, the call handling system scenario, in the test mode, would actually not communicate with external systems, such as computer-aided dispatch systems. Rather, such communications would be simulated.

The method may further include publishing the first protocol to one or more call handling systems. In this regard, publishing may include generating a version control indicator for the first protocol and updating one or more preconfigured protocols with links to the first protocol based on the version control indicator. Additionally, the method may include amending the first protocol and updating the version control indicator based on the amendment to the first protocol. For example, a generated protocol may be subsequently amended in the version of that protocol be updated such that a call handling system user is aware of the version of protocol in operation. In this regard, the method may further include retaining an original copy of the first protocol in a database and preventing access to the original copy of the first protocol during an actual call handling system scenario.

BRIEF DESCRIPTION OF THE DRAWINGS

FIG. 4 is an exemplary data structure for use with a call handler.

FIGS. 13 and 14 illustrate configuration modules of the response advisor.

FIG. 18 illustrates a list of script modules that are viewable via the script builder of FIG. 17.

DETAILED DESCRIPTION OF THE DRAWINGS

Figure 1:
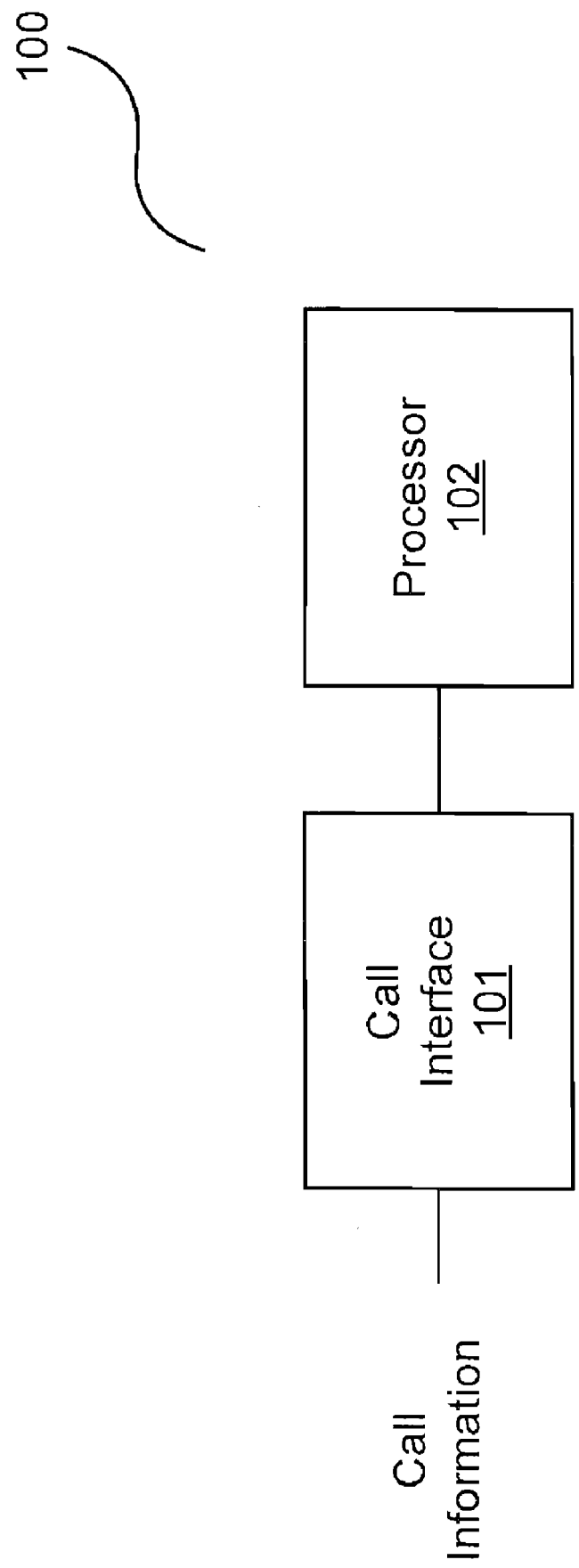
FIG. 1 is a block diagram of an exemplary call handler.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. Accordingly, the invention is not limited to the specific examples described below.

With reference now to FIG. 1, FIG. 1 is a block diagram of the call handling system 100 in one exemplary embodiment of the invention. In this embodiment, the call handling system 100 comprises the call interface 101 and the processor 102 and is configured for handling call information. For example, the call handling system 100 may be configured for interfacing with a telephony system to receive call information and respond to the received information with relevant response information and/or appropriate dispatching information. The call information may regard substantially any of an emergency or a non emergency related situation, such as that received by a 911 call system identifying a certain emergency situation requiring police, fire, medical assistance and/or homeland security. Each call is uniquely handled and subsequently creates a unique record of the events transpiring during the call. In this regard, the call handling system 100 may use a protocol to apply a consistent procedural approach to the management of a call. A protocol is a collection of modules that are displayed under the heading of a chief complaint. A module is a collection of elements that represent questions or advisory statements within a "call phase". As the call-handling system 100 traverses modules during the execution of a protocol, the call handling system is generally referred to as moving between call phases.

While each call may be unique, the call handling system 100 provides call handling consistency by adapting to dynamic situations. For example, the call handling system 100 may allow the system user to dynamically respond to the call information received through a single protocol having a series of communicatively linked scripts. The protocol allows the user to respond with situationally relevant information to the caller, to dispatched response units, and/or to other relevant parties based on the received call information. Since this call information can change, the protocol can generate and relay this relevant information by linking to scripts that are relevant to the call information as it changes. As such, the call handling system 100 may assist a user of the call handling system in recognizing certain situations and in providing appropriate information and/or responses. For example, the call handling system 100 may provide the information necessary for a caller to react to a particular situation. The call handling system 100 may also provide information to a response unit (e.g., fire response, police response, etc.) such that the response unit may properly handle the situation.

The processor 102 is communicatively coupled to the call interface 101, and is configured for processing the call information and for initiating a protocol based on the call information. For example, once certain call information reporting a specific situation (i.e., a chief complaint), is received, the processor 102 processes the information and initiates a protocol that runs a script suited for the specific situation. Scripts as used herein are sets of preformatted processes implemented by the protocol and configured for guiding a user in responding to call information.

An illustrative example of the operative characteristics of the call handling system 100 is now provided. In this example, a caller may use the call handling system 100 to report an emergency situation, such as a fire, a situation requiring police action and/or a situation requiring emergency medical assistance. Information regarding this call may be automatically transferred to the call interface 101 using standard 911 telephony. The data structure passed from the telephony system of one embodiment is also known as ANI/ALI. The ANI/ALI is transferred to the processor 102 in a revised structure to enable cross reference with existing call records in the database 202. Those skilled in the art should readily recognize that the data structure ANI/ALI may be transferred from a telephony system provider. For example, a 911 call generally transfers information about the caller such as the caller's phone number, identification and, in some instances, location. In this embodiment, the information initializes a search through existing call records and if necessary alerts the call handling system 100 of previous incidents from the same telephone number or location prior to the launch of the call handling system's protocol.

A user may operate the call handling system 100 to elicit information from the call in the form of an initial survey question which may already contain ANI/ALI data. Such a question may include a description of the situation for which assistance is sought. Based on the caller's response, the call handler user inputs the information into call handling system 100. The processor 102 processes the input information and initiates a protocol. The initiated protocol, based in part on the call information, identifies and runs an appropriate script.

Once the protocol is initiated, the call handling system 100 prompts the system user to elicit additional information from the caller. For example, the call handling system 100 may prompt the user to ask additional questions of the caller that are specifically relevant to the situation for which the caller seeks assistance. Responses to these questions may dynamically alter the course of the protocol to more appropriately respond to the caller with assistance (e.g., advice and/or dispatched response units).

As the protocol progresses, the processor 102 may further generate data regarding additional detail of the situation. For example, the processor 102 may process the call information and make recommendations based on received call information. These protocol decisions may generate data which the processor 102 may store in a data structure. The data structure may be subsequently transferred to dispatch systems, such as a CAD, to a caller and/or to other relevant parties. A transferred data structure comprising additional information of the situation for which a caller seeks assistance may be used by a particular party to appropriately respond to the situation. For example, the data structure may be transferred to a dispatch system to alert and/or dispatch an appropriate response unit, such as fire, police and/or emergency medical.

In one embodiment of the invention the call handler system 100 is configured to operate within a general-purpose computer workstation. Accordingly, the call handler system 100 may be a software system operable with a computer to perform according to the principles described herein. However, those skilled in the art should readily recognize that other embodiments may fall within the scope and spirit of the invention. For example, the call handler system 100 may be implemented as a mobile computing device, such as a Palm Pilot. Moreover, those skilled in the art should readily recognize that the described embodiment shown and described herein may be configured in hardware, software, firmware and/or various combinations thereof. Those skilled in the art are familiar with hardware, software, firmware and their various combinations.

Figure 2:
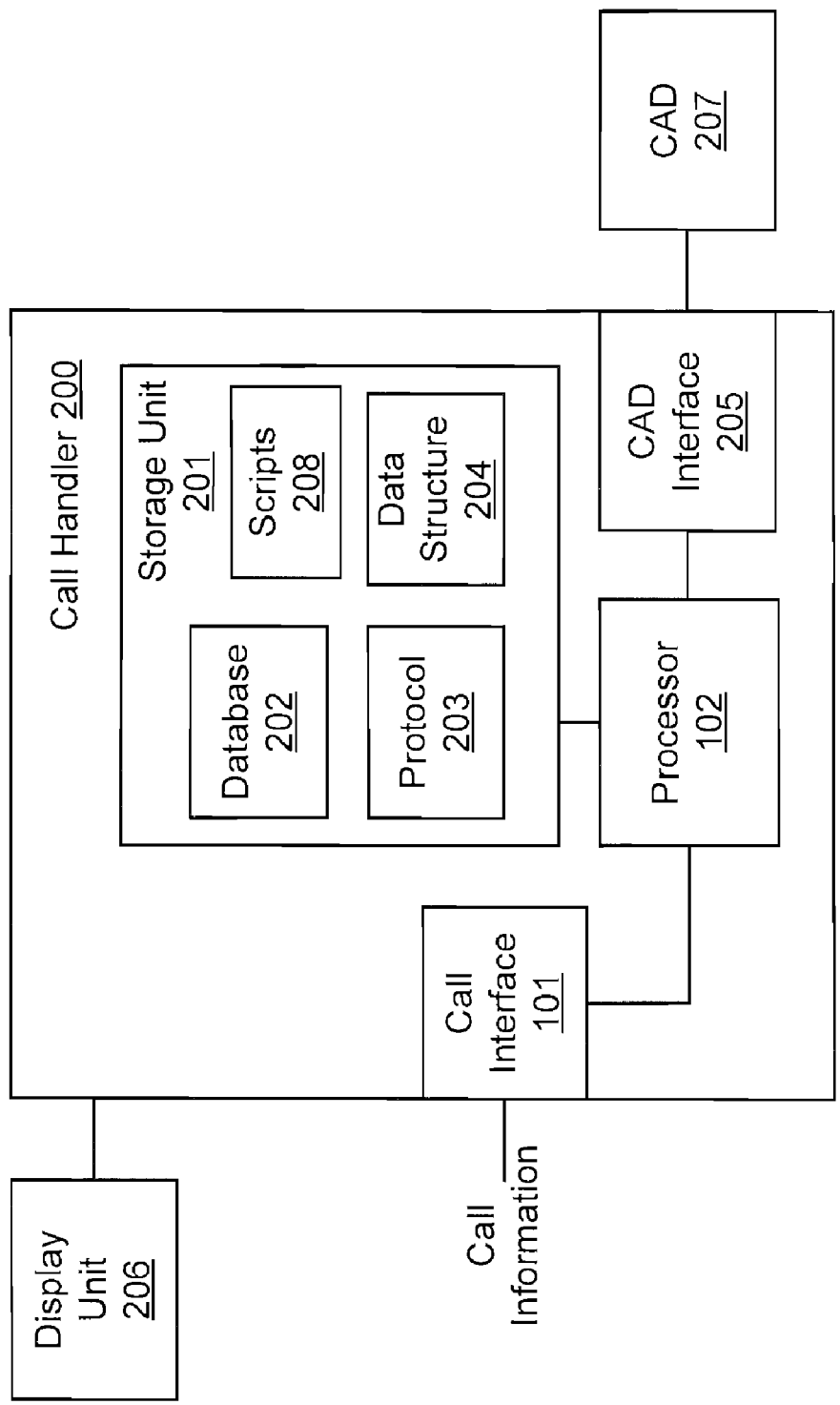
FIG. 2 is a block diagram of a call handler exemplarily configured with a CAD system.

FIG. 2 is a block diagram of the call handler 200 configured with CAD system 207 in one exemplary embodiment of the invention. The call handler 200 is configured to operate in accordance with the principles described herein above and comprises a call interface 101 and a processor 102, as shown and described in FIG. 1.

In this embodiment, the call handler 200 further comprises a storage unit 201 configured for storing a data structure 204, the database 202 of protocol terms and the protocols 203. The database 202 may include a list of words or well known terms used to cross-reference, or rapidly identify, a particular situation based on received call information. For example, as a caller conveys information to a user of the call handler 200, the user may input the information in the form of a keyword into the call handler 200. Keywords may be used to trigger the recommendation of a chief complaint selection (e.g., a top level description of a call type) or trigger one or more events in response to inputs to a script element. The call handler 200 may then populate the database 202 and display a list of cross-referenced protocol terms via a display unit 206. This displayed information provides a "short list" of scripts 208 which are most relevant to the situation presented.

The user of the call handler 200 may select one of the displayed terms which most appropriately identifies the caller's situation. Once a script is chosen, the protocol conforms to the information provided in the script and the user of the call handler 200 is prompted to perform certain actions. For example, a selected script may initiate a protocol 203 and then prompt the user to elicit more information from the caller, alert appropriate response units, convey information to the caller, etc.

The protocol 203 and the associated scripts 208 may be used for emergency related situations, non emergency situations and/or training. For example, certain scripts 208 may be used to initiate a protocol 203 for responding to an emergency situation such as a fire, a situation requiring police, a medical emergency situation and/or a situation impacting homeland security. Additionally, some scripts 208 may be configured for initiating the protocol 203 to respond to a caller when no emergency exists, such as situations when a caller accidentally calls or when a caller is simply requesting information. Moreover, some scripts 208 may be configured for initiating a protocol 203 to train a call handler user in the aspects of call handling.

Once the protocol 203 is initiated and the protocol advances, data structure 204 is filled with data regarding the course of the protocol. For example, a user by selecting indicators from and/or inputting certain information to the call handler 200 may build the data structure 204. A constructed data structure 204 may therefore include information pertinent to the call and/or a dispatch unit. This data structure can then be stored in a database and/or transferred to the CAD 207 via the CAD interface 205.

In another embodiment of the invention, the display unit 206 is also configured for displaying user selectable hot keys. For example, the user of the call handler 200 may select one of the hot keys in order to advise the caller on a course of action in response to circumstances at the scene. The hot keys, in essence, provide "short cuts" to procedures that a system user may access without being directed to do so by an initiated call handling protocol.

In a one embodiment, the presented hot keys are continually available to the call handler user. The call handler user may therefore select a hot key to learn more about handling a particular situation as it is presented. For example, a cardiopulmonary resuscitation ("CPR") for adults hot key may be continuously presented to the call handler user such that the user may obtain more information relevant to CPR should the situation require such assistance. In one embodiment, the hot keys are customizable based on the needs of the call center. Such hot keys may therefore be used to obtain information that is more relevant to a particular call center.

To illustrate one exemplary scenario, a caller may convey information relating to an emergency medical situation, such as that of an adult suffering a heart attack. The user may input terms conveyed by the caller into the call handler 200, which in turn populates the database 202 with protocol terms that the processor 102 identifies as symptomatic of heart related conditions. The display unit 206 may then be directed by the processor 102 to present certain hot keys that are relevant to a heart related, emergency medical situation.

During the exemplary scenario, the caller may convey information that the situation has dramatically changed. For example, the caller may inform the call handler 200 user that the adult has stopped breathing. The system user may, therefore, select a hot key, such as CPR for adults, in response to the changed call information. The processor 102 may process information from the selected hot key to automatically transfer information to the CAD 207 for dispatching a response unit(s) and/or have the user assist the caller. In the CPR example, the selected CPR hot key may alert an emergency medical response unit and/or provide CPR instructions to assist the caller in performing CPR on the adult.

Hot keys are essentially shortcuts enabling quick access to procedures that may otherwise not have been recommended during execution of the script. Procedures not quickly accessible via hotkeys can be selected from a procedure search window within a Graphical User Interface ("GUI"; e.g., the GUI 300 of FIG. 3 below herein). The selection of additional procedures is not exclusively limited to the use of hot keys or procedure searches. Triggers within each script may result in the display of procedures in direct response to data entered by the user. In one exemplary scenario, a caller may respond to a question regarding a victim's breathing status. A response that indicates that the victim is not breathing results in a negative reply keyed into the GUI. This triggers a launch of the procedure for CPR to appear within the existing script display.

In another embodiment of the invention, the call handler 200, in response to information from the caller, may trigger a "bridge" to another protocol 203. Generally, a bridge is a recommendation to change to an alternative protocol script during a call. Additionally, the call handler 200 may be initiated in response to call information and/or when a particular script 208 does not provide the appropriate response information for a call. For example, when call information changes in such a way that the present script is no longer relevant to a presented situation, a selection of a situationally relevant trigger will bridge the protocol to a new script to enable the user to respond more appropriately.

A bridge as described herein is information inputted into the call handler 200 that results in the entrance of another script. For example, information from a caller indicating stomach pain of a victim may result in a script for abdominal pain being automatically loaded into the user interface. Subsequent questions for determining the victim's age and gender may result in a response that may indicate a heart attack and automatically recommend a bridge to a chest pain script.

While one exemplary embodiment of the call handler 200 has been shown and described herein, those skilled in the art should readily recognize that the invention is not intended to be limited to the described embodiment. Other embodiments may fall within the scope and spirit of the invention. For example, although illustrated as being communicatively coupled to one CAD system 207, the call handler 200 may be communicatively coupled to a plurality of CAD systems. Because unique response units are occasionally dispatched from different CAD systems often from different geographical locations, a call handler embodiment with multiple CAD system connections may advantageously parse and transfer information relevant to each dispatched response unit.

Figure 3:
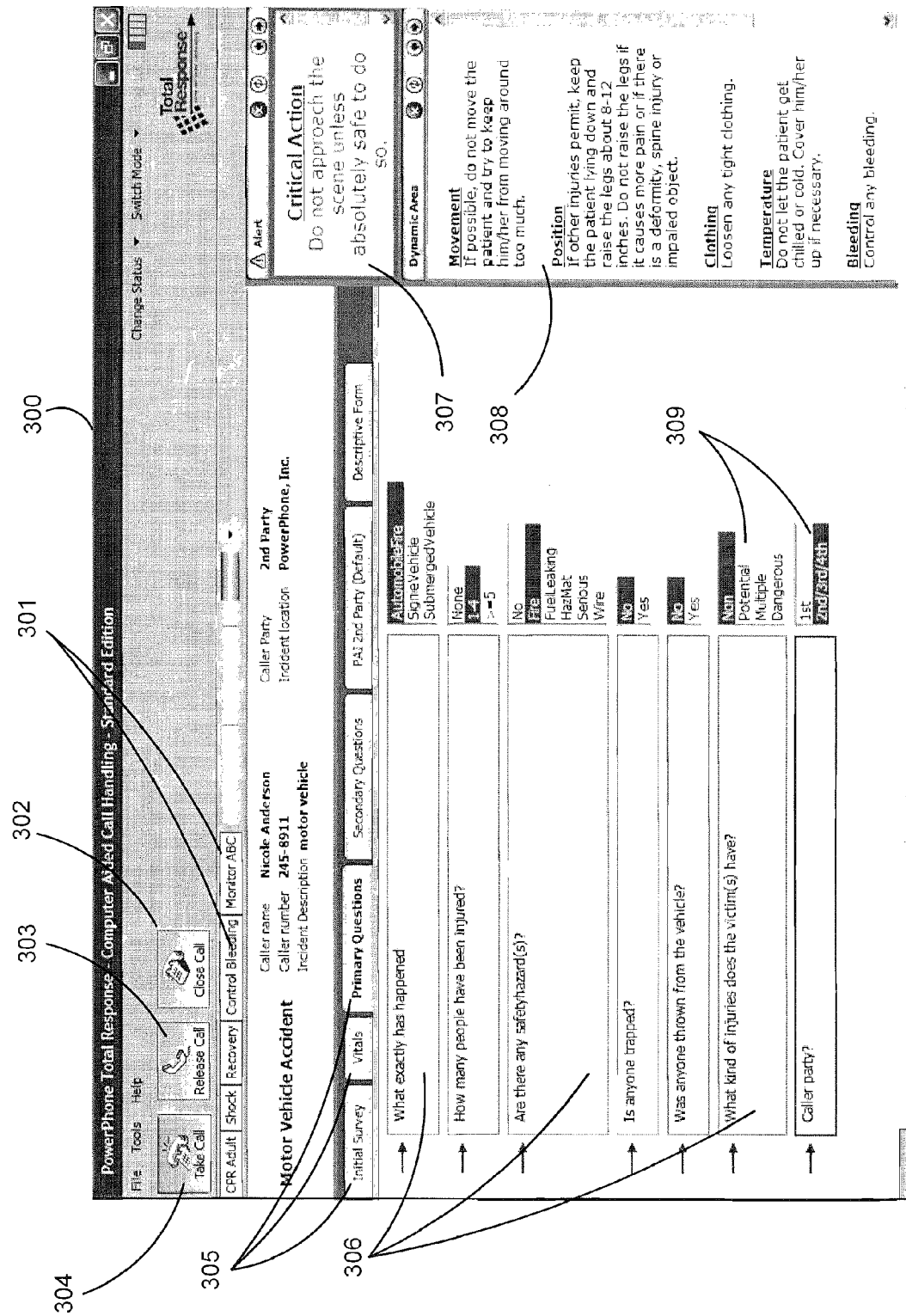
FIG. 3 is an exemplary Graphical User Interface (GUI) of a call handler.

FIG. 3 is a GUI 300 of a call handler in one exemplary embodiment of the invention. Similar to other GUIs and application program interfaces ("API"), the GUI 300 may be displayed using a general-purpose computer monitor through the processing of software instructions. Accordingly, in this embodiment, the GUI 300 represents a software implementation of a call handler system, such as the call handler 200 of FIG. 2.

A general-purpose computer system may controllably operate the GUI 300 as part of a call handler application operable within a computer operating system, such as Windows, Solaris, UNIX, Linux and/or other computer operating systems. Those skilled in the art are familiar with operating systems.

In this embodiment, as a caller conveys call information regarding a situation, a call interface transfers the conveyed call information to a general-purpose computer system. The computer interface may place the call in a pending status until a call handler becomes available. A user of the call handler system may take the call by selecting the "Take Call" button 304 or collect a new call from the "Live Call List" which contains reference to new calls passed directly into the call handler system from a telephony system. A caller may also release a call by selecting the "release call" button 303 to transfer the received call information to another call handler user who may be more qualified, for example, to handle the call information. In one embodiment, the release call button 303 may also transfer the call itself to another call handler user. Additionally a "close call" button 302 is configured for initiating a script from which a call record may be closed.

Hot keys as described in FIG. 2 are displayed as buttons 301 within the GUI 300 of the call handler system. The hot key buttons 301 illustrated in this exemplary embodiment include CPR for an adult, shock, recovery, control bleeding and monitor Airway, Breathing and Circulation ("ABC"). When one of these hot key buttons 301 is selected, the protocol being processed may alter course to direct the call handler user to request information specifically relevant to the selected the hot key 301. For example, when a user selects the hot key 301 for adult CPR in response to received call information, the protocol may dynamically respond to the selected hot key and display information that is relevant to adult CPR via the GUI 300. The protocol may further dynamically respond to the selected hot key by changing the format of the GUI 300 altogether such that the GUI 300 displays CPR related instructions, CPR related protocol tab(s) 305, CPR related alerts window 307 and/or CPR related dynamic area window 308.

The protocol tabs 305, in this embodiment, are configured for building (e.g., inputting information to) a data structure, such as the data structure 204 of FIG. 2. Selected protocol tabs 305 may also progress an initiated protocol. For example, once the caller conveys information to the call handler user, the call handler user may input that information into the call handler system. The call handler system processes the information to select an appropriate protocol (i.e., a protocol script). Once the protocol is initiated, the call handler system may display protocol tabs 305 to advance the protocol and/or configure the data structure. Examples of such protocol tabs 305 include an "Initial Survey" tab, a "Vitals" tab, a "Primary Questions" tab and a "Secondary Questions" tab.

Primary questions are generally intended to determine a dispatch recommendation in relation to conditions at scene. Related to each question may be a number of predefined conditions or descriptors intended to reflect circumstances or potential risks at the scene. Conditions may be referenced to one or more activity triggers (described below) to an initial a range of events including the dispatch recommendation. In this regard, each tab 305 may prompt the call handler user to elicit more information from a caller. For example, a selected Primary Questions tab may present the call handler user with a series of question fields 306 to extract more information regarding the situation from the caller. As exemplarily illustrated, the primary questions tab 305 displays the question fields 306 for determining the following: "What exactly has happened?"; "How many people have been injured?"; "Is anyone trapped?"; "Are there any safety hazards?"; "Anyone thrown from the vehicle?"; and "What kind of injuries does the victim(s) have?" Secondary questions are those which are intended to establish incident details that would be considered useful to responders en route. Secondary questions are generally not intended to influence the dispatch recommendation. Vital Signs are generally questions designed to identify any critical life threatening symptoms (e.g., consciousness and breathing) that would trigger an immediate dispatch recommendation.

Relevant to the questions fields 306 are the user selectable responses 309. These responses 309 may allow the call handler user to rapidly configure the data structure based on a caller response. For example, when the call handler user asks the question "are there any safety hazards," the call handler user may quickly select any combination of the preconfigured responses typically conveyed by a caller. In the safety hazards example, the call handler user may select any combination of the responses of fire, fuel leaking, hazardous materials ("HazMat"), etc. Those skilled in the art, however, should readily recognize that responses 309 described and shown herein are only exemplary of the responses which may be used in the GUI 300.

Other features exemplified in the GUI 300 include an "alerts window" 307 which almost immediately notifies the call handler user of situations requiring urgent action. For example, as the protocol progresses, information immediately relevant to the progress of the protocol may be displayed in the alerts window 307. As exemplarily illustrated herein, the alerts window 307 displays a critical action "do not approach the scene unless absolutely safe to do so." The call handler user may convey this information directly to a caller and indirectly to a response unit through the configuration and transfer of the data structure. Again, those skilled in the art should readily recognize that the alerts window 307 may be configured to display other emergency and/or non emergency event related information.

Still other features include a dynamic area window 308 which may display information, instructions and/or other data relevant to the protocol progress. For example, if the protocol involves an emergency medical response, the dynamic area window 308 may display instructions relevant to that emergency medical protocol. As illustrated herein, the instructions include information for the call handler and/or the caller regarding the movement, position, clothing, temperature and/or bleeding of a person in this particular emergency medical situation. The dynamic area window 308, in essence, performs a function of a "For Your Information" ("FYI") window. Although discussed with respect to emergency medical situations, dynamic area window 308 may display information instructions and/or other data relevant to the situation presented, such as a situation pertaining to fire, police and/or homeland security.

While one embodiment has been shown and described in detail, those skilled in the art should readily recognize that the GUI 300 may be configured in a variety of manners to operate in accordance with the principles of the invention described and illustrated herein. Accordingly, the invention is not intended to be limited to the illustrated user interface of the GUI 300. Further, the invention is not intended to be limited to any particular protocol described within the GUI 300. Other protocols such as those relating to non emergencies and/or other emergencies may also fall within the scope and spirit of the invention.

FIG. 4 is a data structure 400 in one exemplary embodiment of the invention. In this embodiment, the data structure 400 is representative of a chief complaint from a caller. The data structure 400 comprises one or more data sections such as an initial survey section 401, an emergency indications section 402, a primary questions section 403, a secondary questions section 404 and a dispatch instructions section 405. As a protocol advances, the data structure 400 is configured with data within the one or more data sections. This data may be advantageously used by a CAD system to alert and/or dispatch a response unit(s). However, those skilled in the art should readily recognize that the data of the data structure 400 may be transferred to other devices communicatively linked thereto. For example, the data may be transferred to pagers, mobile computing devices, cellular telephones, emergency radio devices capable of receiving data, and/or network based computing systems. Additionally, this data may be configured in a variety of well-known formats, such as e-mail and text messaging, to alert various response agencies.

Examples of initial survey information may include caller information, such as a caller's phone number and the caller's party type (e.g., a first, a second, a third or a fourth party type). For example, a person calling about a situation involving that person is identified as a first party type caller. That person's phone number and party type may be input to the data structure 400 is part of the initial survey 401. Examples of a second party type include a person who is simply reporting the incident and who is also in close proximity to the incident. Examples of a third party type include a person reporting an incident some distance away from the incident location. Examples of fourth party type may include agencies, such as alarm monitoring centers. Other information related to the initial survey may include initial conditions such as types of distress and/or emergency situations for the specific purpose of determining the correct call handling script to be used. For example, the initial conditions surrounding a fire may include the type of structure on fire and whether the blaze is still burning.

The emergency indications 402 may include information for situations of immediate attention. For example, a person may call a call handler system to complain of chest pains. Such a complaint may alert the call handler user to dispatch immediate medical assistance as the chest pains may be symptomatic of a heart ailment. The emergency indications 402 may also be used to provide additional detail of the location of the situation.

The primary questions 403 may include clarifying information regarding the chief complaint. Information contained herein may be used to facilitate a dispatch recommendation. For example, as the protocol progresses, the call handler user may be prompted to ask additional questions regarding the caller's specific situation. The corresponding information may be used to clarify information that was previously conveyed by the caller. Additionally, the information of the primary questions may be used to raise awareness for those involved to a heightened state for the situation (e.g., situations involving police and/or fire response). For example, the primary questions may be used to determine possible risks and/or dangers at the scene for the persons at the scene as well as responders dispatched thereto.

The secondary questions 404 may include additional information that was elicited from a caller to assist responders en route to the incident scene. Such information input to the secondary questions 404 data section may include information regarding a specific condition of the situation. For example, in a chemical fire, the secondary questions 404 may contain information elicited from a caller regarding the exact type of chemical and any instructions for a responding fire unit.

Also in this embodiment of the data structure 400 is the section 405 for configuring the data structure 400 with dispatch instructions/recommendations in terms of priority and types of responders needed at the scene. Additionally, a further section includes pre-arrival instructions. Pre-arrival instructions are generally modules that feature a variable number of questions/statements to provide optional advice to callers regarding procedures to ensure, for example, the safety of persons at the scene or preserve evidence. The instructions can be uniquely formatted in the data section 405 in response to an initiated protocol.

An additional feature of each data section pertains to customizable fields. These fields may include information relevant to certain procedures of a particular call center. For example, one call center may have procedures that differ from those of another call center. Accordingly, the data structure may be formatted to include information that is relevant to a specific call center.

Although described in detail with respect to one exemplary data structure, those skilled in the art should readily recognize that other data structures may be generated to have one or more of the data sections described and illustrated herein. Accordingly, the invention is not intended to be limited to the described embodiment.

Figure 5:
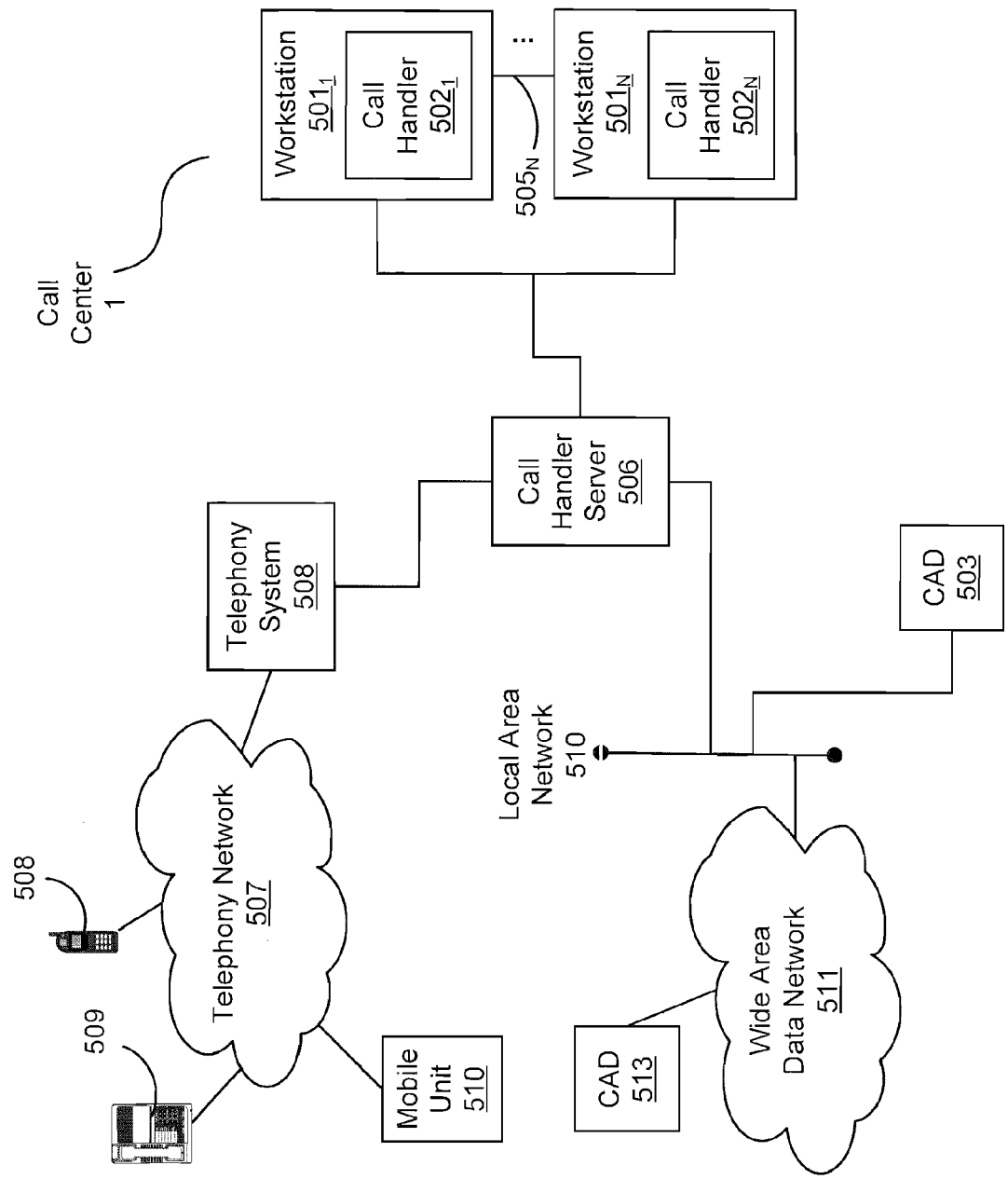
FIG. 5 is a block diagram of an exemplary call handling network.

FIG. 5 is a block diagram of a call handling network in one exemplary embodiment of the invention. In this embodiment, a caller may convey call information from any of a mobile type device (e.g., a cellular telephone or a mobile computing unit, such as a PalmPilot) or a "land line" based device (e.g., a typical home phone or a computer terminal). These devices (labeled 508, 509 and 510) may communicate through a telephony network 507 to convey call information to the call handling network. Additionally, a telephony system 508 is communicatively connected to the telephony network 507 for receiving the call information from the caller.

In this embodiment, a call center 1 is configured with a subnetwork of the call handling workstations 501. A call handler server 506 is configured for transferring the call information from the telephony system 508 to a call handling workstation 501 (labeled $501_1 \ldots 501_N$) within the call center 1. For example, the telephony system 508 may be a switching system or a router that receives calls from the telephony network 507. The telephony system 508 may transfer a call to the call handler server 506 for subsequent processing by a call handling workstation 501.

The call handler server 506 may determine which the call hander 502 is to receive the call and initiate a call handling protocol. For example, the call handler server 506 may be aware of the call hander 502 capabilities (e.g., user qualifications, call backlog, etc.). Accordingly, the call handler server 506 may assign a received call to one of the call handlers 502 based on the capabilities of the call hander. Once assigned, the call hander 502 runs the protocol as initiated by the call handler server 506

The call handling workstations 501 are configured for operably controlling associated call handlers 502 (labeled $502_1 \ldots 502_N$). For example, a call handling workstation 501 may be configured from a general-purpose computing system, such as a personal computer ("PC"). As such, the call handling workstation 501 may include software operable to control and display the call handler 502 (see e.g., GUI 300 of FIG. 3).

The call handler 502 may operate similar to the embodiments shown and described herein above. The call handler 502 may further comprise additional features which allow for the communicative coupling to other call handlers within call center 1. For example, the call handler 502 may comprise network components which allow a call handler user within a particular call center to transfer call information via communication link $505_N$ to another call handler within the call center (e.g., the button 303 of FIG. 3). Such a communicative coupling may be advantageous when a user of a first call handler 502 needs to transfer the call information to a user of a second call handler 502 because the user of the first call handler is either unqualified or too busy to handle the call. Network components are known to those skilled in the art and may be implemented through a combination of hardware and software components.

In this exemplary embodiment, the workstations 501 have no direct communication with CAD 503. The call handler server 506 supports the logic, trigger handling and communication functions, as well as acting as a central repository of protocol scripts. For example, the call handler server 506 may be configured to receive call information and initiate an appropriate protocol. Once triggered by a call, the call handler server 506 may provide protocol information to a logically selected call handler 502. Such a selection may be based on capabilities of a given call handler 502.

Each workstation 501, however, may retain an independent copy of the protocol scripts to enable continuity in the event that connection with the server is lost. In such an event, the call handler 502 may continue to be used to ask appropriate questions and record any information provided by the caller. This data may then be copied to the server when the connection is restored.

The call handler 502 may transfer dispatch information to any local CAD 503 via the call handler server 506 and a communicative coupling to a Local Area Network ("LAN") 510. Alternatively, the call handler 502 may transfer dispatch information to a remote CAD 513 via the call handler server 506 and a communicative coupling to Wide Area Network ("WAN") 511. LANs and WANs are known to those skilled in the art. This dispatch information may be in the form of a data structure such as that described in FIG. 4. The CADs may use the dispatch information to alert and/or dispatch an appropriate response unit. In one embodiment of the invention, the call handler 502 is capable of transferring information to a plurality of CAD systems, such as the CAD 503 and the CAD 513, to alert a plurality of associated response units. For example, a highway collision between automobiles may require the assistance of police, fire and medical response units. Accordingly, the call handler 502 may transfer information to CAD systems associated with a plurality of unique response units that are necessary to the situation presented.

The network described and illustrated herein is only exemplary in nature. Those skilled in the art should readily recognize that the number of call centers and/or call handler workstations within a call center may be a matter of design choice. Accordingly, the invention is not intended to be limited to the illustrated embodiments.

Figure 6:
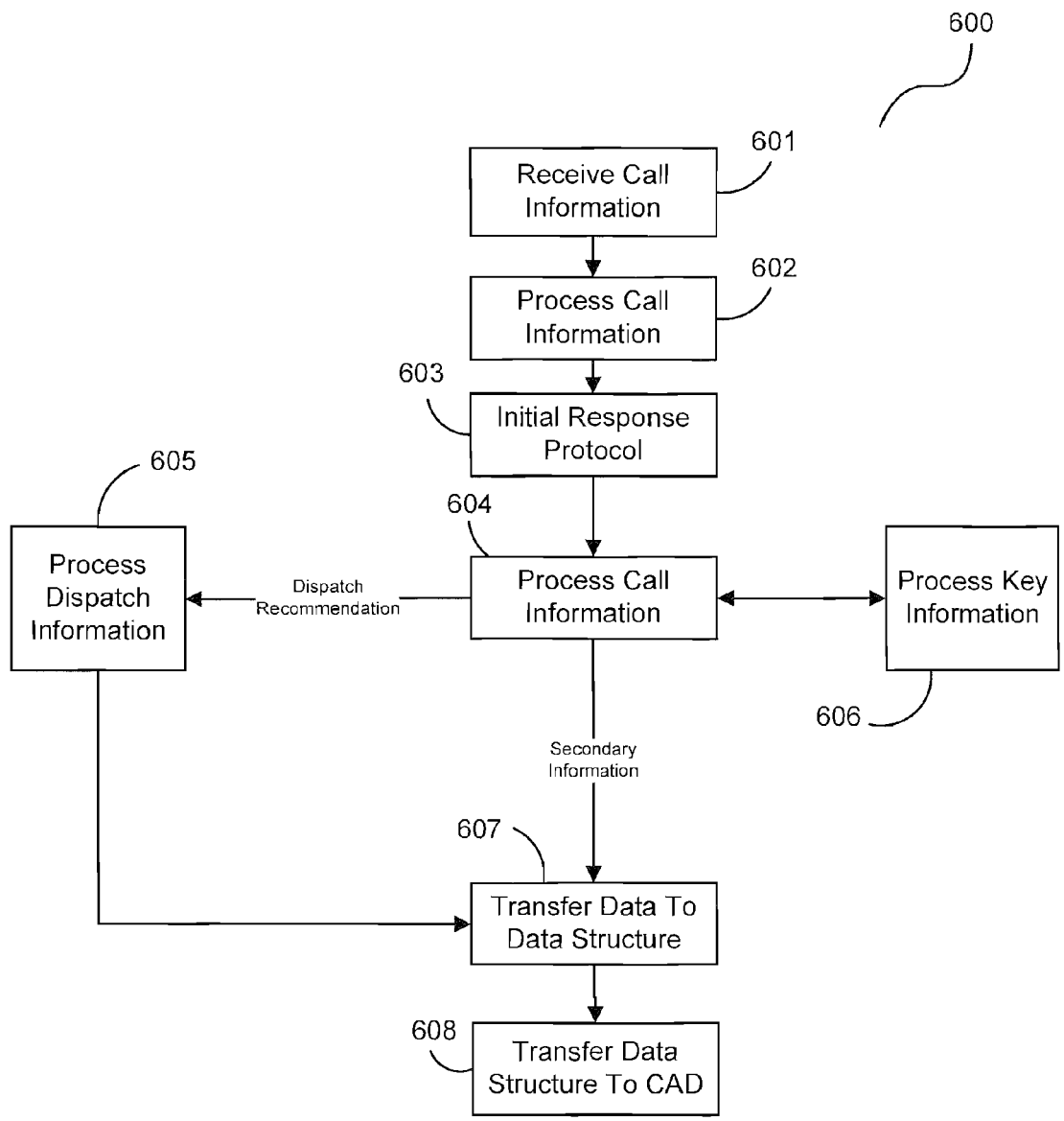
FIG. 6 is a flowchart an exemplary call handling process.

FIG. 6 is a flowchart illustrating an exemplary process 600 of a call handler system. Call information is received in the process element 601. For example, a caller identifying information relating to an emergency situation or a non emergency situation may convey call information to a call handler system of the described embodiments described herein above to report the situation. The call information is processed in the process element 602 to provide an initial protocol (the process element 603). For example, a processor, such as the processor 102 of FIG. 2, may determine an appropriate protocol based on the call information and initiate the protocol therefrom.

While the protocol is in progress, a call handler system may respond to certain indications by processing call information in the process element 604. Processed call information may result in a dispatch recommendation presented to the call handler user. This dispatch information may be either accepted or rejected by the call handler user, in the process element 605. Accepted dispatch information may be transferred to data structure in the process element 607.

The call handler user may also be provided with certain user selectable hot keys that when selected are processed to provide information to call handler user, in the process element 606. For example, once a certain situation is presented to the call handler user, the user may select a continually present hot key that is relevant to that situation. Once selected, information and/or instructions may be presented to the call handler user to allow the user to appropriately respond to the situation. In one embodiment, the call handler may process information from selected hot keys and/or received call information to change a protocol to respond to other situations being presented in the process element 606. In this embodiment, the hot key information can be processed and call handling can be thereby redirected to another protocol script. For example, when a caller conveys information of a specific situation, a call handler user may select a pre-defined condition relevant to that situation. In the event that a hot key is selected and/or based on processed call information, the call handler system may automatically recommend another protocol that is more relevant to the situation presented to the call handler user.

During the processing of the protocol, secondary information, such as that described hereinabove, may be transferred to a data structure, in the process element 607. Because of the secondary information and the dispatch information, the resulting data structure may provide information that is relevant to an appropriate response. Once enough information has been transferred to the data structure, the data structure may be transferred to one or more CAD systems, in the process element 608. For example, once enough information has been received to select an appropriate dispatch response, the data structure may be transferred to the CAD system to alert and/or dispatch the appropriate response units.

Figure 7:
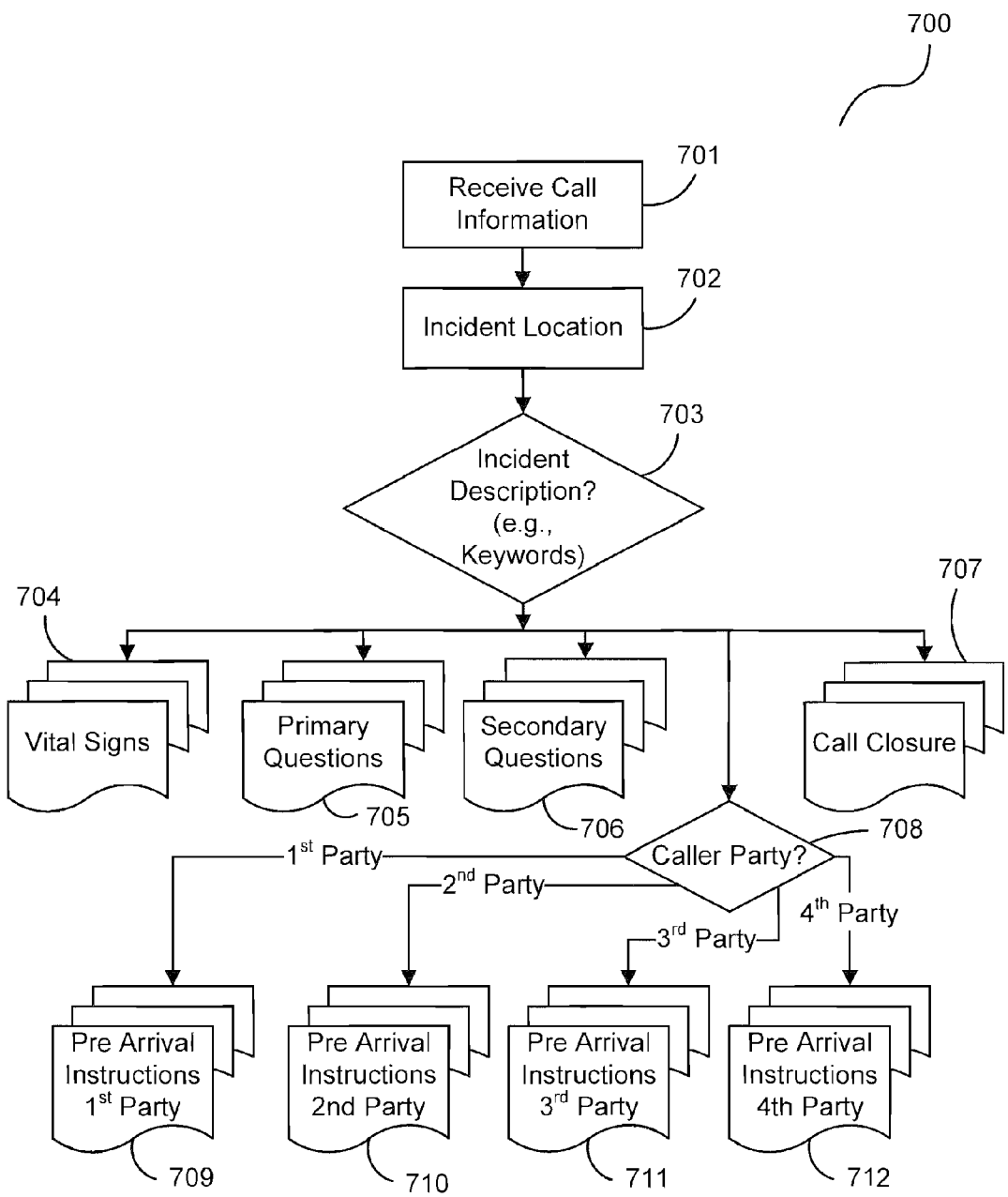
FIG. 7 is a flowchart another exemplary call handling process.

FIG. 7 is flowchart of another process 700 of the call handler system. In this embodiment, the process 700 represents certain process modules relevant to a call handling system, such as those described and illustrated herein. In this regard, the process 700 may be generally referred to as a protocol model.

The features or process elements of the process 700 may be generic to any developed protocol of the call handler system. For example, call information may be received in the process element 701 to initiate a protocol. With the protocol initiated, an incident location is determined, in the process element 702. The protocol may then prompt a call handler user to elicit more information from a caller, in the process element 703. For example, the call handler user may be presented with questions for the caller to determine an incident description such that the call handler user may initiate the protocol based on a selection of keywords populated from a database.

Once a keyword is selected, the call handler user may be presented with a protocol interface in the form of a GUI, such as the GUI 300 described in FIG. 3. This protocol interface may include question fields and/or buttons to construct a data structure, such as the data structure 400 of FIG. 4, with information relating to the situation reported by the caller. For example, the user may be presented with the vital sign questions 704, a primary question 705 and/or the secondary questions 706 as described in the GUI 300 of FIG. 3. It is not a necessary feature of the invention, however, for the user to ask these questions in any particular order.

In some embodiments, the user may ask these questions in an order that the user believes is relevant based on the user's experience. In one embodiment, a call handling system may determine which questions are to be asked first based on preprogrammed decisions within the call handling system. For example, once a protocol is initiated, a certain preprogrammed script may prompt the user to ask some or all of the questions 704, 705 and/or 706 in an order that was predetermined for a particular situation.

Based on questions asked of the caller, the call handler user may have determined the type of caller party type in the process element 708. Once the caller party type is determined, pre arrival instructions and/or other information relevant to the caller may be formatted with the data structure, in the process elements 709, 710, 711 and 712 (i.e., respective of the party types 1, 2, 3 and 4). The formatted data structure may then be used to ensure appropriate instructions are available to the call handler in relation to the caller's immediate needs. For example, the first party caller may call with information pertaining to a certain emergency situation. Once information about the first party caller is ascertained, pre arrival instructions may be formatted with this information and used by the call handler user to assist the caller.

The number of the caller party types may depend on the protocol in progress. For example, a protocol may be initiated in response to call information regarding a particular caller type. Some caller party types, however, may not be relevant to the protocol in progress. Accordingly, these caller party types would not be necessary for presentation to the user of the call handling system performing the method described herein. Such an embodiment allows the protocol to operate in a manner relevant to the identified caller party type.

In one embodiment of the invention, the process may be configured with a call closure prompt 707 which may prompt the call handler user to end a call. For example, if a caller needs to attend to the situation at hand, the call closure prompt 707 may prompt the call handler user to elicit final information from the caller and/or convey final instructions/information to the caller. Such information may also be a formatted in the data structure for use by a response unit.

These processes are representative of the features of the call handling system which may be relevant to a particular protocol in progress. It is not necessary, however, that each of these features be presented for a particular protocol. For example, the protocol is configured (i.e., programmed) with scripts designed to dynamically respond to a call. As each call may be unique, certain questions (i.e., 704, 705 and 706) may not be necessary for the particular protocol in progress. As such, unnecessary questions would not be presented to the user.

FIGS. 6 and 7 illustrate exemplary methodical embodiments of the invention. Those skilled in the art should readily recognize that the processes and steps shown and illustrated herein may be arranged and/or altered in other ways that fall within the scope in spirit of the invention. Those skilled in the art should also readily recognize that the embodiment may be implemented through software instructions. Such instructions may be stored on a storage media and retrieved and executed by a computer processor. Some examples of instructions are software, program code and firmware. Some examples of storage media are memory devices, tapes, disks, integrated circuits and servers. The instructions are operational when executed by the processor to direct the processor to operate in accordance with the invention. Those skilled in the art are familiar with storage media, instructions, processors and their various implementations.

Figure 8:
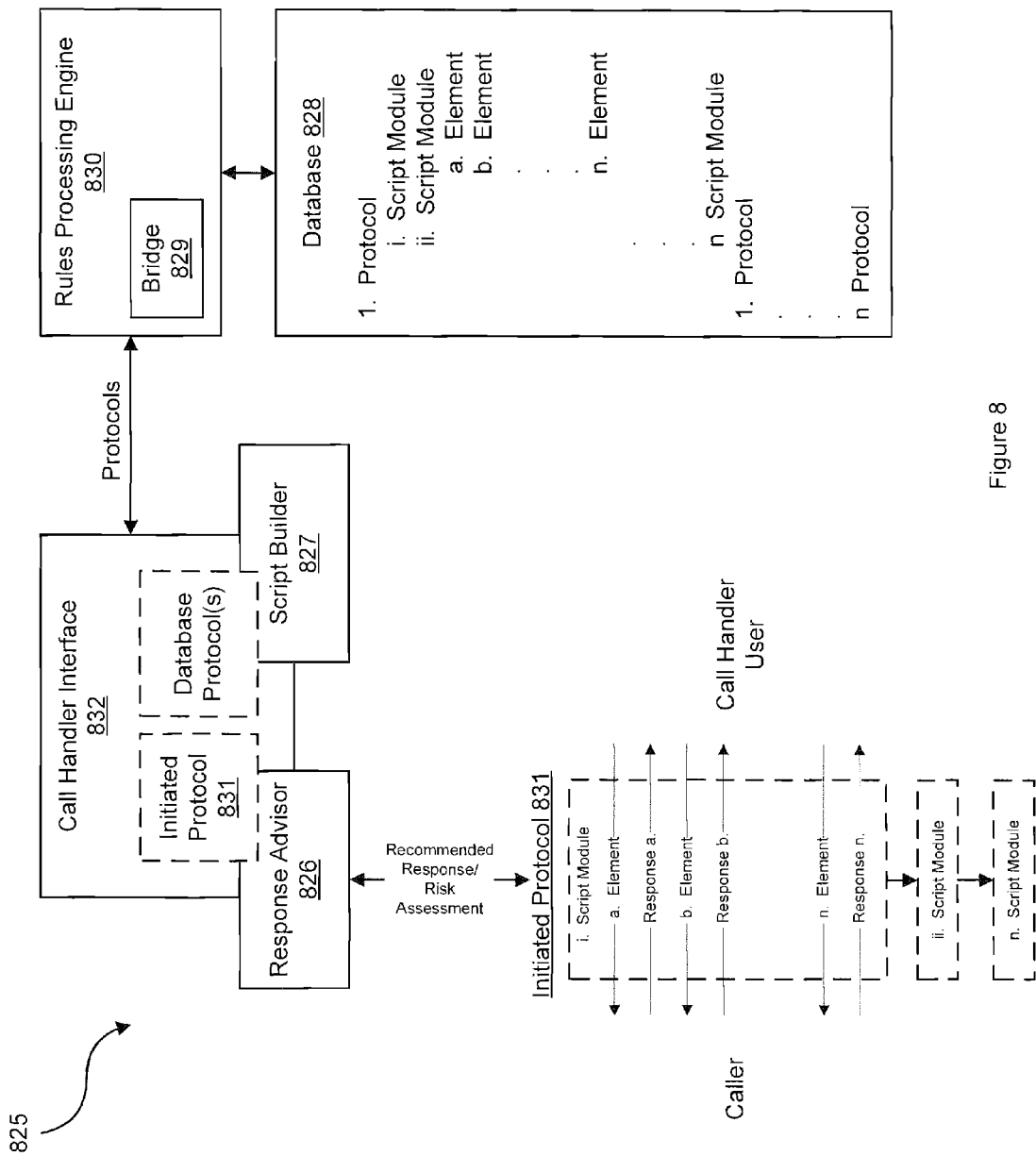
FIG. 8 is an exemplary call handler system employing a response advisor and a script builder.

Turning now to FIG. 8, a block diagram of an exemplary call handling system 825 configured with a response advisor 826 and a script builder 827 is presented. The call handling system 825 may operate in accordance with any of the call handling functionalities described hereinabove. For example, the call handling system 825 may direct a user of the call handling system to interact with a caller to provide assistance to the caller based on an initiated protocol of the call handling system.

The protocols described herein are generally top-level descriptors associated with a particular event of the caller. For example, a CPR protocol may provide instructions to the call handler user such that the user may direct the caller to perform CPR on a person in need of assistance. The protocols may be configured of individual script modules with each containing one or more script elements (e.g., questions or statements to be used by the call handler user). Using the CPR example, a first module of the CPR protocol may include script elements relating to briefing whereas a second module of the CPR protocol may include script elements relating to acquiring assistance from other people. In other words, each module may represent separate phases of an anticipated call (e.g., as depicted in the process 700 of FIG. 7).

When handling an actual call, entry into every protocol may be through an initial survey module that records caller information (e.g., identification of the caller), the incident location, and a description of the incident. Keywords associated with the protocols may be used to recommend selection of an appropriate chief complaint. The associated protocol is then initiated and displayed on the caller handler interface. Each module of the protocol may also appear as a tabbed area containing script elements that have been configured using the script builder.

Generally, the protocol content may be influenced by certain variables at the time a chief complaint is selected. For example, information from the caller party may determine a type of pre-arrival module to be displayed via the call handler interface. Additionally, the prevailing homeland security alert status level may be displayed with a particular module.

The script builder 827 of this embodiment is configured for generating the protocols, script modules and elements of the call handling system 825. The generated protocols may be stored in the database 828 for subsequent use in assisting a caller. Additionally, the script builder 827 may provide the user with the ability to amend protocols by adding and deleting individual script modules or changing the modules by changing individual script elements within various script modules. The script builder 827 may also provide a means for generating individual script modules that may be used interchangeably with various protocols. One example of such a module would include a call initiation module which elicits basic information from a caller. Such a module would likely be used in almost any call scenario The response advisor 826 of this embodiment is configured for detecting conditions incident to a caller's response. For example, the user of the call handling system 825 may receive a call from a caller requiring assistance. Based upon some initial question, the call handler user may input a keyword into the call handler system 825 via the call handler interface 832. The rules processing engine 830 may select an appropriate protocol from the database 828 based on that input keyword. The protocol 831 is then initiated within the call handler interface 832 such that the user may ascertain information from the caller and provide the required assistance. The call handler user may input information into the call handler interface 832 for the detection of conditions by the response advisor 826. The response advisor 826 may, in turn, recommend a particular response type (e.g., police, fire, EMS, etc.) and/or offer an assessment of the risk. Additionally, the response advisor may provide information relating to a particular dispatch. For example, the response advisor 826 may include contact information and/or skills associated with a particular response type, such as police, fire, etc.

The response advisor 826 may also select other protocols based on a detected condition. For example, as the call handler user inputs information from the caller, the response advisor 826 may detect conditions associated with other emergencies. The response advisor 826 may transfer the detected conditions to the rules processing engine 830. The bridge 829 of the rules processing engine 830 may select another protocol or even an individual script module from another protocol based on the detected condition such that the call handler user may appropriately respond to the caller.

In one embodiment, the response advisor 826 can trigger a dispatch recommendation at the moment that a chief complaint is selected and the protocol script is displayed on the screen; no additional questions are required. In this regard, the dispatch recommendation may be automatically pushed to an external dispatch system (e.g., a CAD system) without the operator having to accept the response advisor 826's dispatch recommendation. Such automatic dispatch recommendation may be configured within a script via the script builder discussed below. For example, an agency may use a policy that, upon notification of a structure fire from a caller, the dispatch process may be notified when the call handler user selects a "structure fire protocol". In an alternative example, selection of a chest pain protocol may require inputs that establish whether a patient is a male over 50 years of age such that the call handler user may determine whether an immediate dispatch recommendation is proper or whether more questions should be asked. If the victim is a 50 year old male and is either unconscious or not breathing, not only is the CPR procedure made available to the call handler but an automatic dispatch recommendation may be "pushed", or transferred, to CAD system without intervention by the call handler user.

Figure 9:
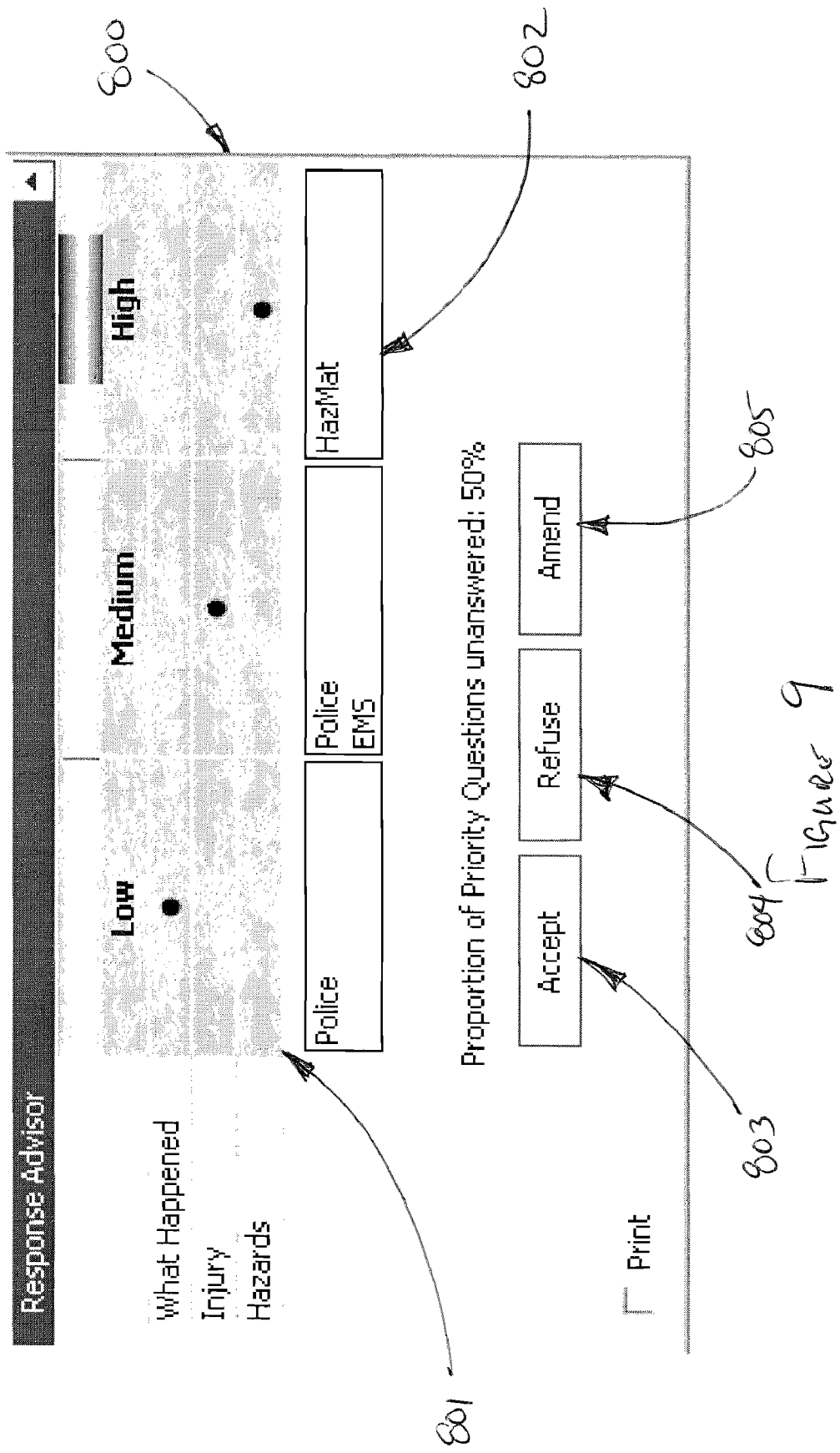
FIG. 9 is an exemplary response advisor.
Figure 10:
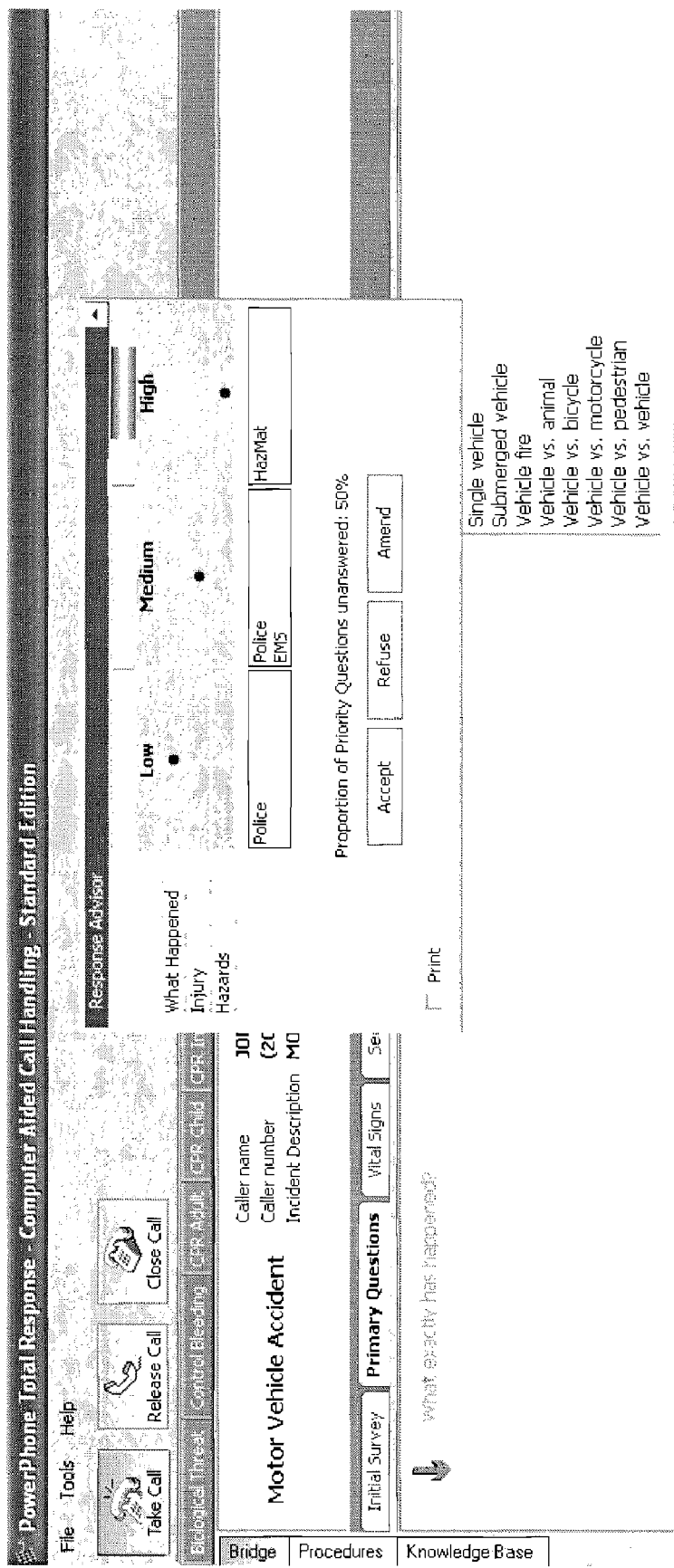
FIG. 10 is a response advisor embodied with a call handling GUI.

Turning now to FIG. 9, a response advisor 800, such as the response advisor 825 of FIG. 8, is presented. The response advisor 800 is generally a tabular display configured with the call handler system to show conditions that have triggered a dispatch recommendation. FIG. 10 illustrates how the response advisor may be configured with a call handler graphical user interface, such as the call handler GUI 300 of FIG. 3, to operate within the context of the call handlers described hereinabove.

The response advisor 800 is configured for providing an objective risk assessment 801 based on information received during a telephone call. In this regard, the response advisor 800 may detect certain conditions derived from scripted questions of the call handler. For example, a condition is generally an answer to a script element that may be pre-defined and/or causes an activity trigger to occur upon selection. In this regard, the call handler may direct a user to ask certain questions of a caller such that the user may elicit information from the caller. The elicited information may then be input to the call handler. Based on the information, the response advisor 800 may generate the risk assessment 801 (e.g., high risk, medium risk, and/or low risk of an event, injury and/or hazard). The risk assessment 801 may be generated from one or more single caller responses. The questions that are provided by the call handler are the result of a script builder component of the call handler system, as described herein below. In one embodiment, the range of levels of the risk assessment is an adjustable feature available to the user. That is, the user may change the range of risk assessment levels as desired. levels. Additionally, the response advisor 800 may recommend a particular type of response. For example, the response advisor may recommend the dispatch of a hazmat team based on caller responses relating to a chemical spill. In this regard, the risk assessment 801 may, in turn, be associated with the recommended response. For example, as the inputs from scripted questions are made, the inputs may trigger the response advisor with a condition that recommends a responder type and priority. The priority may be denoted by a weighted numeric value defined via the script builder component to represent the risk significance to persons at or responding to the location where the incident is occurring. The response advisor 800 may also indicate the presence of conditions using a color scheme to represent priority (e.g., low, medium, high).

When the call handler user is handling a call, the user may initiate the response advisor via the call handler to view the conditions that have triggered an advised response such that the user may act upon the information. The nonintrusive nature of the response advisor 800 allows a user to interface with the response advisor while continuing to elicit information from a caller based on the scripted questions.

The response advisor 800 may also assign multiple responder types to any condition, thus providing a "multi-agency integration". For example, an emergency scene from which a caller is calling may require the use of police, fire, and/or hazmat teams. In this regard, each category of an advised response may be flagged with a risk assessment 801 to illustrate the urgency of the response. For example, some incidents could require an immediate response from police, fire and EMS services but also utility services to repair downed wires as a support service.

The response advisor may also indicate the strength or weight of the dispatch recommendation based upon the proportion of questions used during the risk assessment. This measurement generally does not change the manner in which the user acts upon the recommendation. Over time it may provide data on the ratio of recommendations and decision strengths that may indicate whether a review of script content is advisable.

Figure 11:
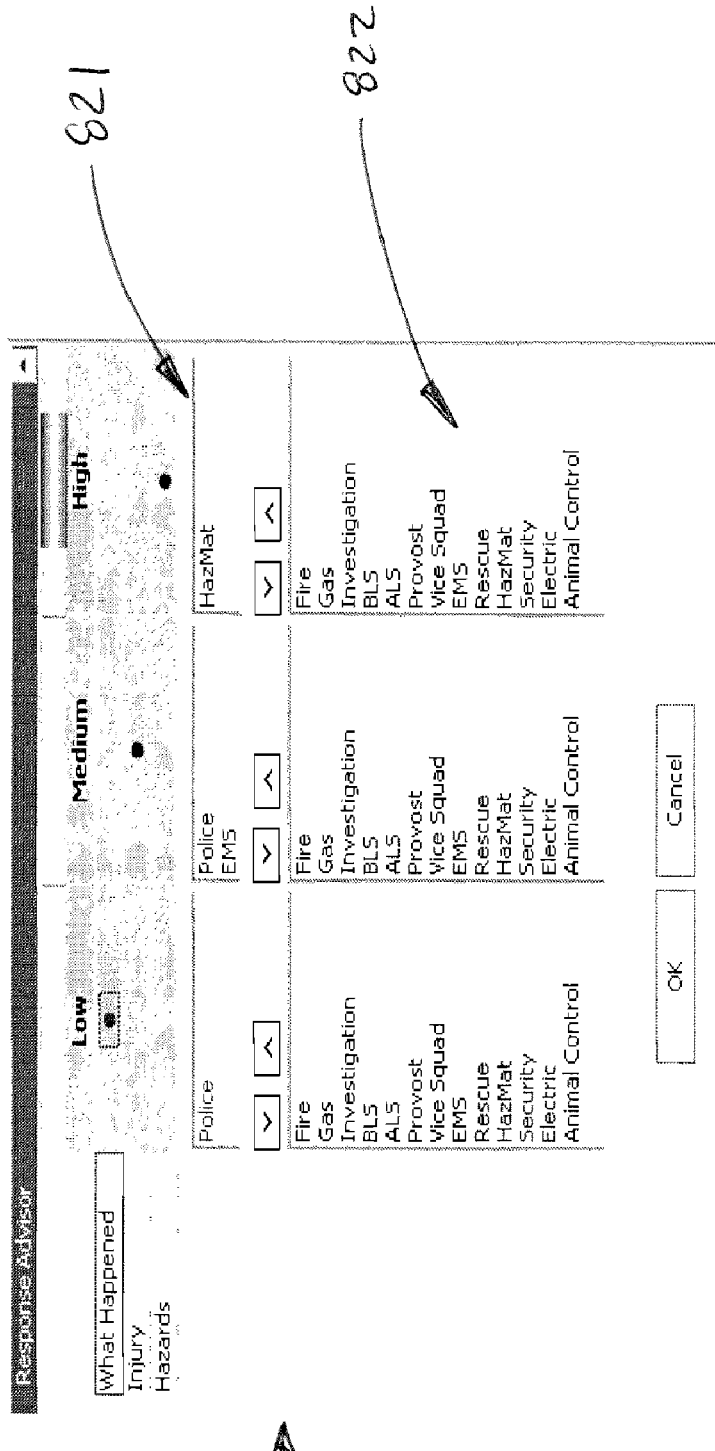
FIG. 11 is an amendment mode interface of the response advisor.

Once initiated, the call handler user may use the response advisor 800 to take action with respect to an advised response. For example, the response advisor 800 may allow the user to accept (803) a recommended response that conveys a dispatch recommendation to the appropriate dispatch function. Since different responder types (e.g., police, fire, etc.) may be dispatched from different locations, the response advisor 800 may be configured to alert multiple dispatch locations. The response advisor 800 may also allow the user to refuse (804) and advised response thereby indicating an acknowledgement of the recommendation but declining to act upon it. For example, the call handler user may determine that a dispatch is under way and therefore requires no dispatch recommendation. Also, the response advisor 800 may allow the call handler user to amend (805) the advised response thereby allowing the user to change priority of any condition and/or change responder types from an advised response. An example of the response advisor 800 in an amend mode is illustrated in FIG. 11. The response advisor amend window 820 allows the user to add or remove various responder types for a given event. For example, if the response advisor 800 indicates that a hazard is in effect and the risk assessment for that hazard is high, the response advisor may automatically advise the dispatch of a hazmat team as illustrated in response indication window 821. The user, however, may also wish to require the dispatch of, e.g., emergency medical services (EMS) and rescue. Accordingly, the call handler user would select those two elements from the selection window 822 such that the EMS and rescue may also be dispatched.

Figure 12:
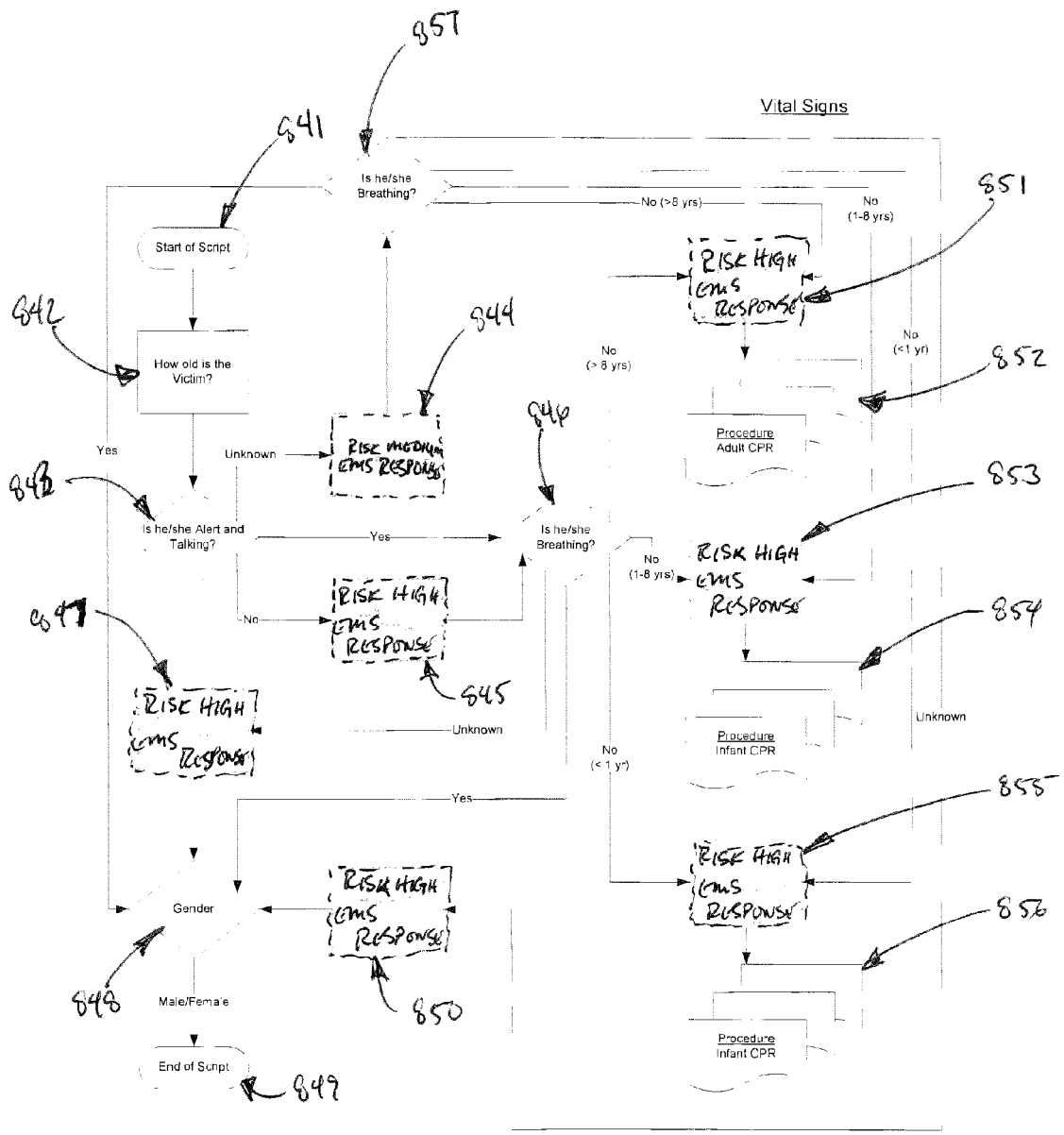
FIG. 12 is a flowchart of an exemplary response advisor and call handling process.

FIG. 12 is a flowchart of an exemplary response advisor and call handling process 840. The process 840, while descriptive with respect to a particular response, is not intended to be limited to the described response. The response advisor 800 may be used to configure virtually any number of response types. For example, the logic used by the response advisor 800 may be defined within the scripted questions and managed through the Script Builder interface, described hereinbelow, to provide assistance with virtually any dispatch system.

Additionally, the response advisor 800 may use "activity triggers" that are referenced to pre-defined inputs for the user to select. Generally, an activity trigger is a scheduled or event driven action that occurs when a condition is selected. For example, when an input is selected by the user of the call handler system, one or more activity triggers may be activated. The activity triggers may be created from rules or combinations of conditions that result from the scripted questions. For example, a male over 50 or a person unconscious and not breathing may require a particular type of response. The call handler user may ascertain such information based on a line of questioning within a particular script. Upon obtaining this information, the call handler user may input the information to the call handler system. The response advisor may, in turn, be triggered by the information and provide a recommended response or course of action.

In this embodiment, the process 840 illustrates the decision flow through a single protocol module and the data triggers that communicate with the response advisor. Question statements that contain predefined responses are denoted by diamond shaped symbols (i.e., the process elements 857, 843, 848, and 846). Statements that allow an open ended response are displayed as square symbols (i.e., the process element 842). Links to alternative script modules are represented by overlay symbols (i.e., the process elements 852, 854, and 856) containing the word "Procedure". The procedure modules generally contain questions and/or statements that are not directly part of a protocol. They may be linked to protocols during a call when specific conditions are triggered. Activity triggers that update to response advisor are shown with dashed lines and contain the responder type and their priority (i.e., the process elements 844, 845, 847, 850, 851, 853, and 855).

The process 840 starts with the initiation of a script in the process element 841. The script may inquire as to the age of the victim, in the process element 842, such that the information may be input to the call handler system by the call handler. The process 840 may then inquire as to whether the victim is alert and talking, in the process element 843. Based on this information, the process element 843 may trigger communication with the response advisor. For example, if it is unknown whether the victim is alert, the process element 843 may trigger communication with the response advisor to indicate that the risk is medium and in EMS (i.e., emergency medical services) response may be required. If the victim is not alert, the response advisor may respond by determining that the risk is high and EMS response again may be required. However, if the victim is alert, the process 840 may traverse to the process element 846 to assess other conditions of the victim, such as whether the victim is breathing, in the process element 846. For example, if victim is alert but unable to breathe as determined by the process element 846, the process element 846 may trigger initiation of the response advisor in the process element 847 to determine that the risk is medium and that an EMS response may be required. Such a condition may be indicative of choking.

The process elements 844 and 845 may also direct the call handler to inquire as to whether the victim is breathing, in the process elements 857 and 846. Upon making such determinations, the process 840 may require that the call handler inquire as to other characteristics of the caller, such as age and gender (e.g., the process element 848). The response advisor, in addition to providing a recommended response and/or assessing a risk, may also describe a procedure that should be performed by the caller until the response can be provided. For example, the response advisor may provide a CPR (i.e., cardiopulmonary resuscitation of the process elements 852, 854, and 856) procedure to the call handler. The call handler may, in turn, convey that information to the caller such that the caller can administer the procedure. The process 840 ends with the process element 849 as the initiated script has completed.

Figure 13:
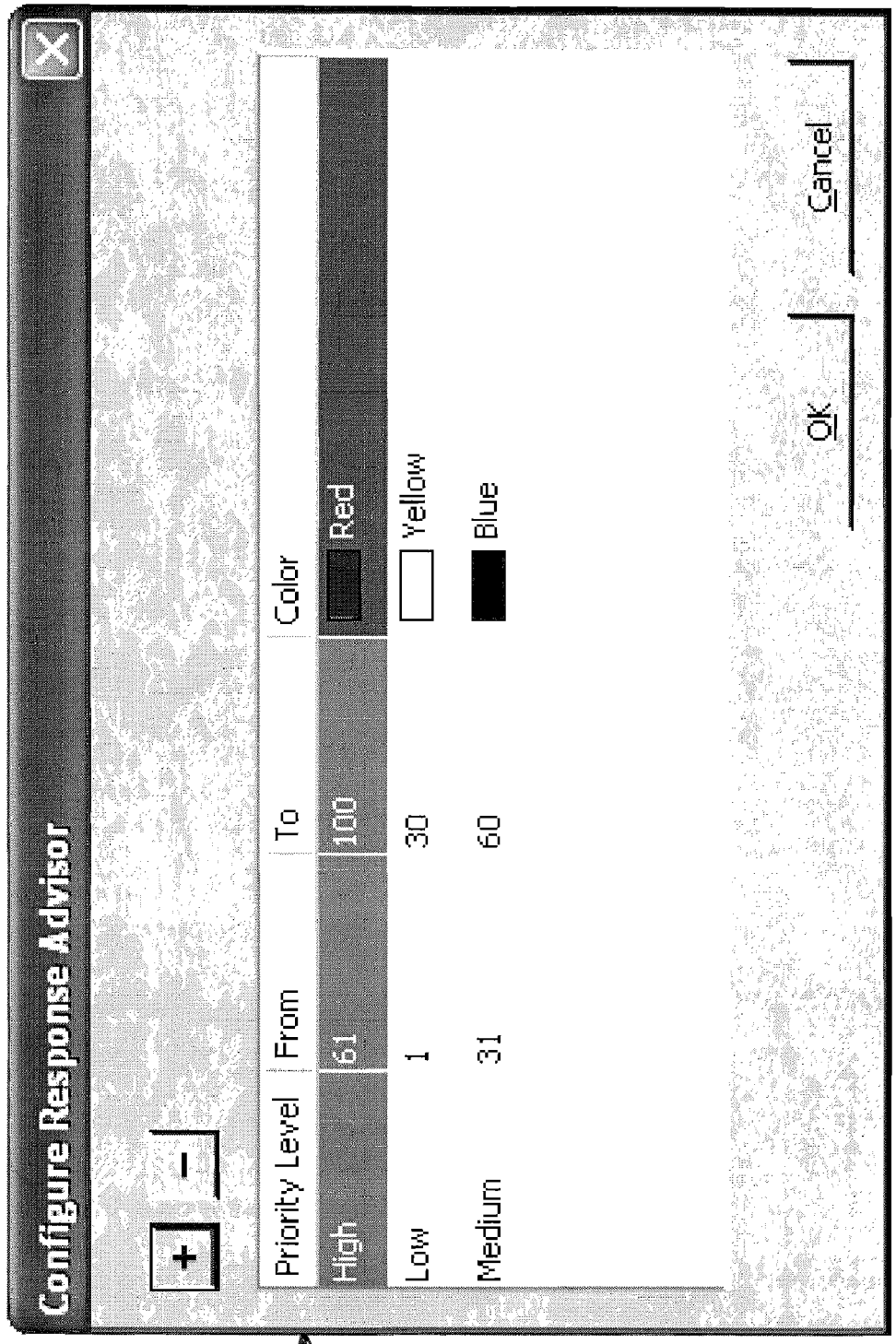

FIGS. 13 and 14 illustrate configuration modules 870 and 880 of the response advisor. The configuration module 870 allows a user or an administrator of the call handler system to input/change color codes to identify priority of a particular response (e.g., red for high-priority, yellow for low priority, and blue for medium priority). Other variables of the response advisor that may be changed by the call handler user or administrator include the risk types. For example, the response advisor may more discreetly assign risk by using numbers (e.g., a scale of 1 to 8) as opposed to using low medium and high for risk assessment. In this regard, acuity levels may be defined as numeric values to allow client sites to restructure the Response Advisor without necessarily changing existing scripts.

The configuration module 880 allows the user or administrator to input, change and format various responder types, such as EMS, police, fire, etc. For example, the configuration module 880 may be used to input contact information of a particular response type such that the responder may be contacted. Alternatively or additionally, the configuration module 880 may be used to configure a skill level associated with response type. For example, an individual or an organization may be configured with contact information using the configuration module 880. The skills (e.g., security skills, fire prevention skills, emergency medical skills, etc.) of this individual or organization may also be input to the response advisor using the configuration module 880 such that the call handler user can determine whether the response type is appropriate for a given situation. Once set, these skill types may be referenced via the script builder so they may be linked to activity triggers that indicate the presence of critical conditions to the response advisor during a call.

Figure 15:
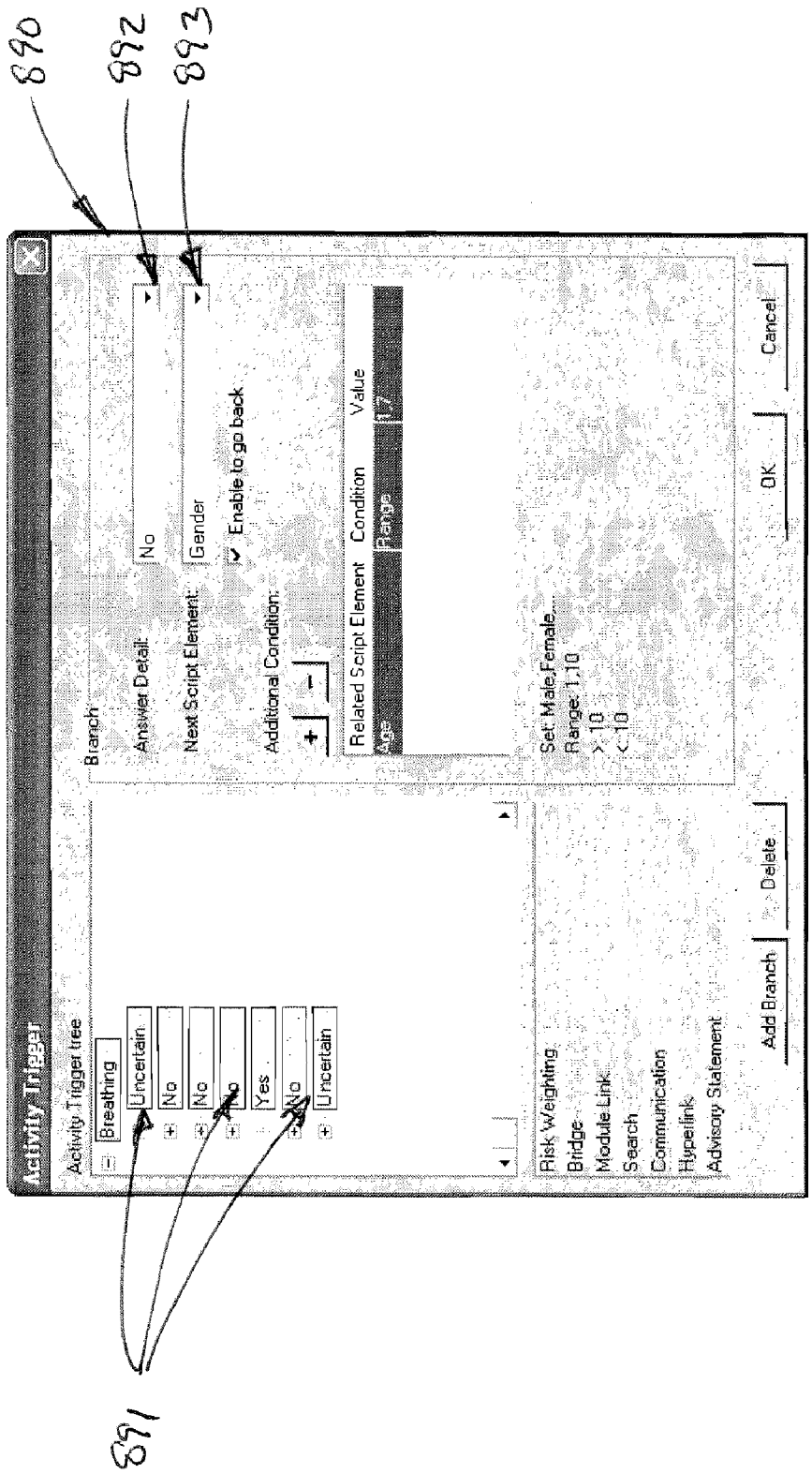
FIGS. 15 and 16 illustrate an activity trigger module of the response advisor.
Figure 16:
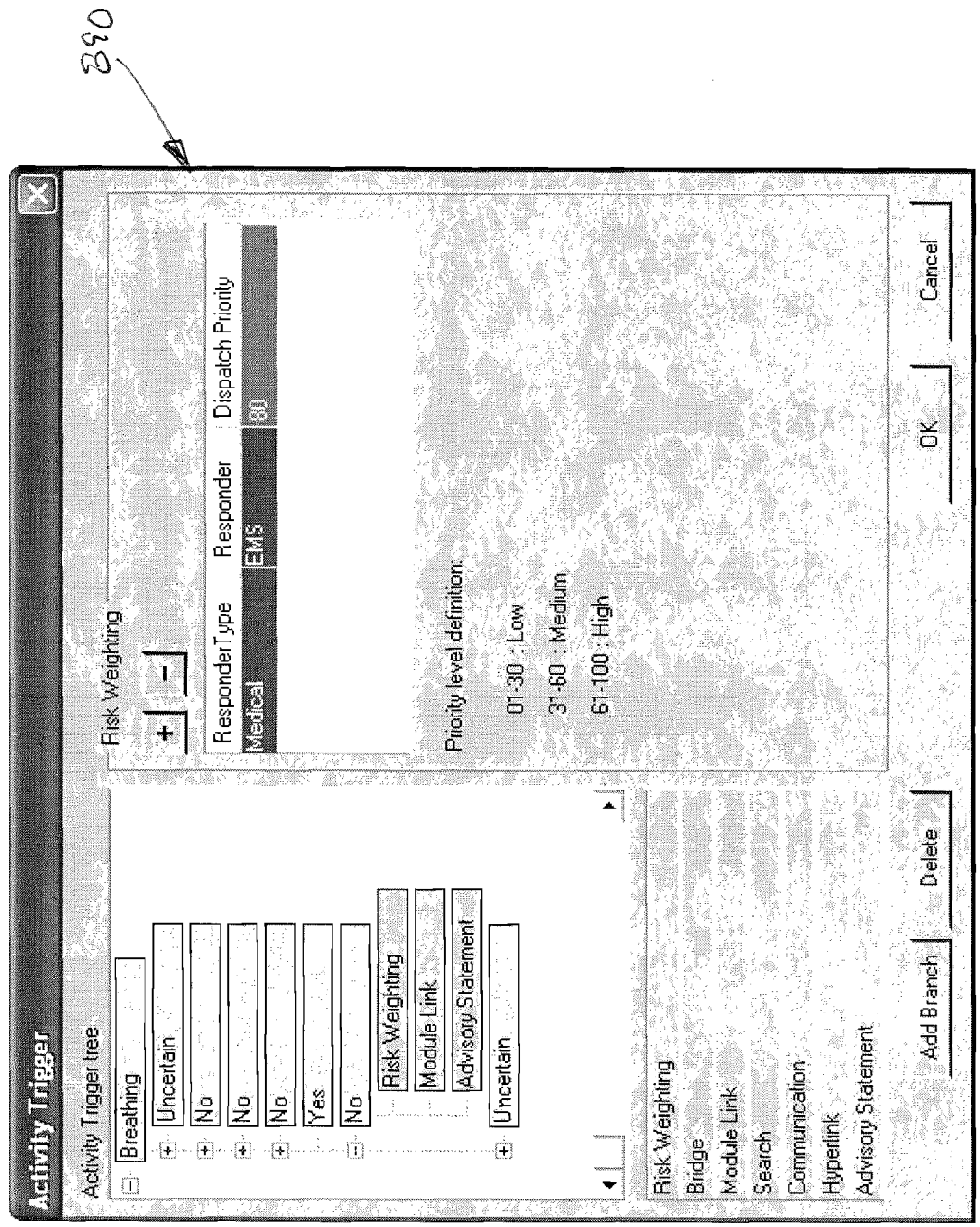

FIGS. 15 and 16 illustrate an activity trigger module 890 in which properties of activity triggers 891 (e.g., the process elements 844, 845, 847, 850, 851, 853, and 855 of FIG. 12) may be defined. For example, once the logical design of a script and its associated response triggers have been completed, a process flow can be constructed into the activity trigger properties within the script builder module. In this regard, each activity trigger 890 may be configured with anticipated response information of the caller (e.g., short answer detail 892) and direction of the next script element 893. Additional trigger branches may also be configured with a particular script through the activity trigger module 890.

Additionally, activity triggers can result from the combined inputs of scripted questions. For example, a related script element may be defined as being within a range, greater than, less than or equal to the activity trigger to which it is linked. In this regard, the response advisor can reflect risk priorities across a broad range for the assessment of dispatch recommendations. As the response advisor is triggered, the significance of the risk can also be reinforced by the trigger of visual alerts displayed to the user as well as the presentation of alternative script modules containing additional questions for the user to ask or safety advice for the user to give to the caller.

Figure 17:
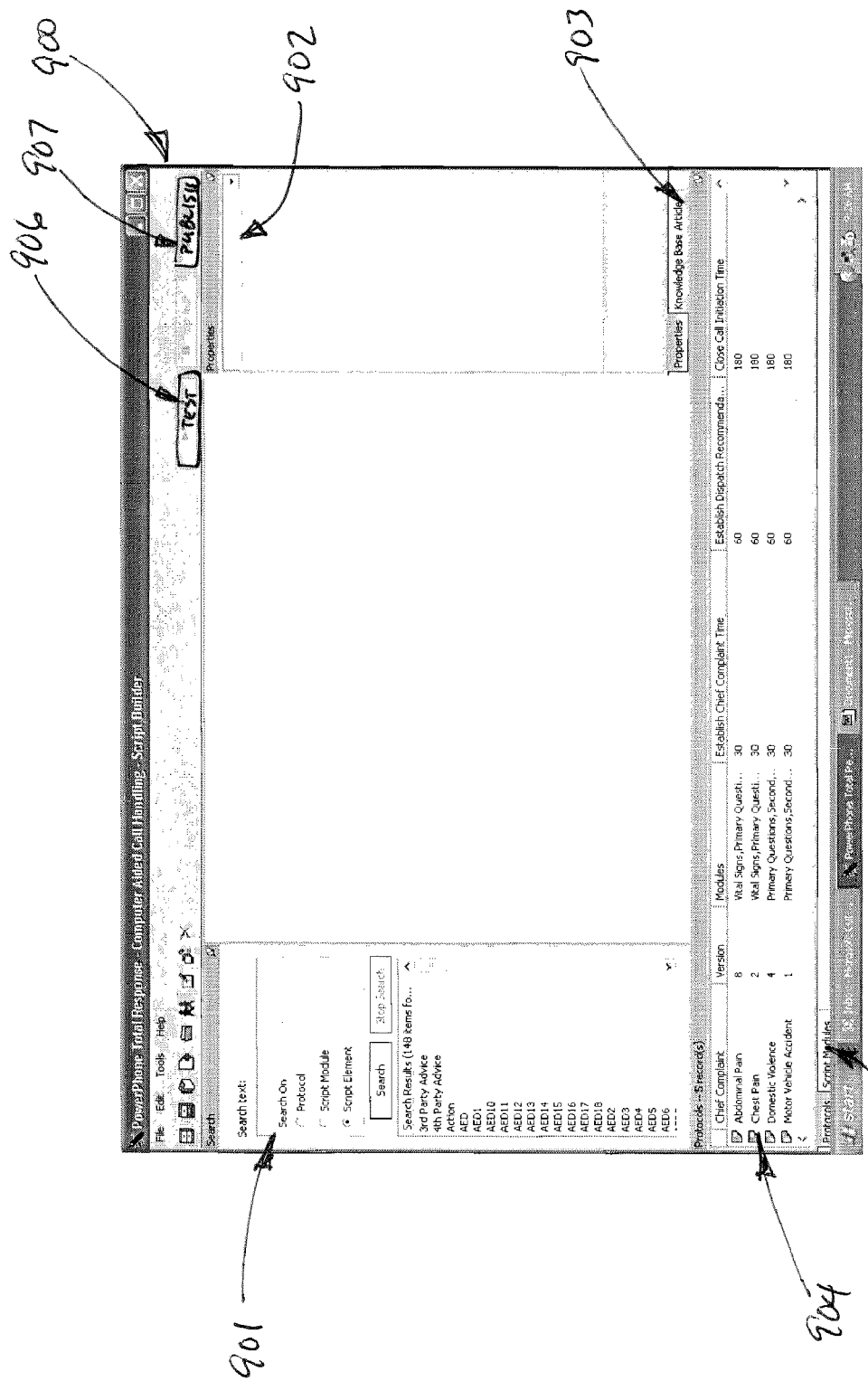
FIG. 17 illustrates a script builder for use in a call handling system.

Turning now to FIG. 17, a script builder 900 for the call handler system is presented. The script builder 900 provides a means to create and amend call handling scripts (e.g., protocols) and procedures that are used by the call handler system. For example, the script builder 900 may create protocols and store those protocols within a central server database for use by the call handler system when a caller is in need of assistance. Stored protocols may be retrieved by the script builder 900 when the amendment of a particular script is desired.

In general, any given protocol created by the script builder 900 contains the following pre-defined module types: vital signs; primary questions; secondary questions; and call closure. A pre-arrival type module is generally used to identify/ define the party caller. The display order of these modules within a protocol, however, can be defined by the user. The homeland security alert status property may be used to alter the content of a protocol when displayed via the call handler in response to a change in the homeland security alert indicator. For example, when the homeland security alert status changes levels, a particular protocol may indicate such or even change in regards to such (e.g., morph into another protocol).

In this embodiment, the script builder 900 is configured as a software program that is operable within a Windows operating environment, although other operating systems may be used. In this regard, the functions of the script builder 900 may be activated by use of either the file menu or tool bar icons. For example, the search section 901 may provide the means for searching and selecting protocols, script modules or elements that are already in existence (e.g., stored within the database 828 of FIG. 8).

The properties section 902 may allow the user to dynamically create and/or modify data for each protocols, script modules or elements. For example, properties such as the advisory statement, the chief complaint, close call initiation time (e.g., the acceptable time for handling a chief complaint in seconds), establishment of the chief complaint time (e.g., the acceptable time for establishing what the chief complaint is in seconds), establishment of the dispatch recommendation time (e.g., the acceptable time for establishing a dispatch recommendation based on the chief complaint in seconds), publication of a protocol (e.g., the availability of a generated protocol), the protocol version number, and various keywords assigned to the protocol, may be modified, added, or deleted to a given protocol The protocols, script modules or elements that are built and/or modified via the script builder 900 may be referenced throughout the call handler system by means of the knowledge base articles tab 903 of the script builder 900. For example, a protocol may be built via the script builder 900 so as to direct a call handler system user to assist a caller with CPR. This CPR protocol may have metadata associated therewith that is able to link to documentation associated with CPR, such as medical journals and the like. Once the CPR protocol is selected by the user, the CPR documentation is loaded into the knowledge base articles tab 903. The user of the call handler system may view these articles in, for example, in HTML format via a web browser (e.g., Internet Explorer, Safari, Firefox, etc.) by selecting a hyperlinked article in the knowledge base articles tab 903. Additionally or alternatively, such articles may be viewed in the GUI of the call handler system. For example, the articles may be "launched" and viewed in the dynamic area window 308 of the GUI 300 FIG. 3. In this regard, the GUI display of the articles may be automatically triggered by a script (e.g., based on a detected keyword), manual selection by the operator from the knowledge base articles tab 903.

The protocol list view 904 allows a user to select, duplicate, modify and delete protocols from the database. For example, the protocol list view 904 may provide a window into the central database to show all of the protocols presently stored therewith. The user may select any of these protocols to modify, delete, and/or duplicate the protocols as desired. The protocol list view 904 also to provides various details of the protocol such as the dispatch recommendation, associated script modules, version number, and various timing elements associated with the protocol (e.g., the time required by the protocol to complete).

Figure 18:
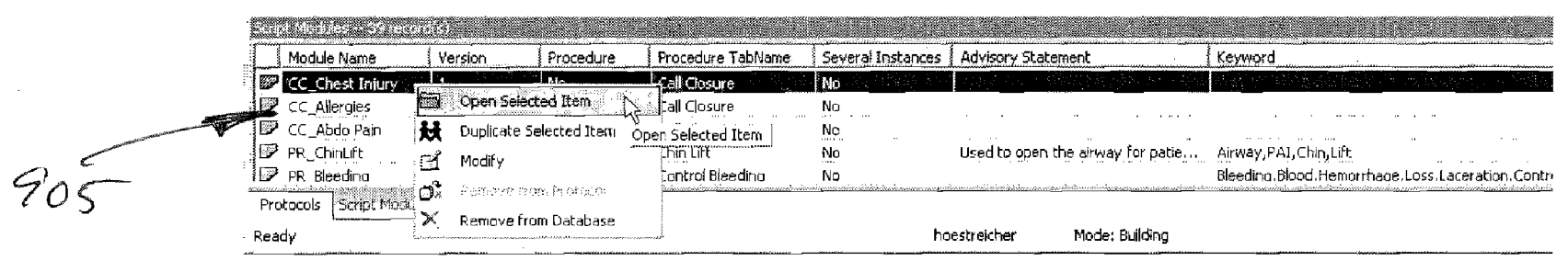

In a similar fashion, the script modules tab 905 of FIG. 18 provides a view of various modules associate with a protocol. For example, after a user has selected a particular protocol from the protocol list view 904, the script modules tab 905 may be selected by the user to illustrate the various modules associated with that particular protocol. The user may similarly modify, delete, and/or duplicate script modules for the selected protocol and/or for use in another protocol (e.g., a presently existing or newly generated protocol). Examples of modules that may be modified in the script modules tab 905 include: the identity of the calling party; the homeland security level that a particular script module will be active under; the name of the associated or protocol; the type of script module (e.g., primary questions, secondary questions, vital signs, pre-arrival, call closure, additional procedure and descriptive); an advisory statement for a particular script module if necessary; keywords associated with a particular script module for search purposes; the module name; procedure designation of a module (e.g., for hot key purposes described hereinabove); the module version number of a module; and the instantiation number of a given module.

Generally, the creation and/or amendment of protocols and modules are controlled by a number of rules that should be considered. For example, the script builder 900 may have a predefined set of rules used to configure protocols that are inherent to virtually any call handling situation. However, the script builder 900 may allow for the configuration of call handling rules associated with particular business. For example, the call handler system may be configured to operate with a tow truck dispatching system. In this regard, a user of the script builder 900 may import various script building rules that are applicable to tow truck dispatching. Such rules would, for example, be processed by the rule processing engine 830 of FIG. 8 to provide scripts for a user of the call handling system to provide dispatch requests to tow trucks throughout a particular region.

In one embodiment, the script builder 900 may be used to configure a module that operates within a protocol or even as a stand alone procedure. Additionally, the script elements of a particular module are generally configured with a unique identifier (e.g., for indicating the purpose of the element). Each script element may be copied into more than one module and the content of the element changed to reflect the purpose of the module. In such case, the copied script element action creates a new version of the element with a unique version number. Script elements bearing the same name and version number generally can not be created.

A script element may have a pre-defined answers and free text entry fields. In this regard, free text entries may be used to activate triggers through the definition of key words that the operator might place in the free text box. For example, the question "Does the patient have any allergy medicine?" may be configured in a protocol relating to allergies. If the caller's response includes the words Epi-Pen, or Epi or Epipen, the call handler system user may input any of these into the free text field of the script element. The rules processing engine 830 may process the input word which thereby triggers the display of a recommended manner in which to use an Epi-Pen device. Similarly, the predefined answer field may allow for the user to select an answer and automatically trigger such a response. The script builder allows the creation of answer 'collections' to be defined against which triggers can be created.

Examples of script element features that may be amended or created include the following: possible answers to selected scripts; the script element name; the content to be displayed with the script element; the type of script element (e.g., a statement, a single answer question, or a multiple answer question which enables the user to select one of several anticipated responses by a caller); allowance of text entry fields for a caller's descriptive response; the order of individual scripts within a module; the script element version number and/or instantiation number; and activity triggers for use by the response adviser.

In regards to the activity triggers, the script builder 900 may be used to configure activity triggers within generated protocols. For example, the script builder 900 may be used for the configuration of activity triggers within various script elements that, upon detection of certain conditions by the response adviser, generate a predetermined response or process for the user to employ. In this regard, the script builder 900 may be used to set the conditions to be computed in conjunction with a selected answer. The conditions may also be made against the answers from other script elements in an initiated protocol. For example, a predefined answer "No" (i.e., as selected based on a response from the caller) may be used to trigger a risk weight, a link to another module, and an advisory statement when it is selected. Examples of activity triggers that may be configured with script elements include: the answer detail field (e.g., the option of choosing a text field for receiving a caller's descriptive response); the next script element to be employed upon selection of an anticipated caller's response and/or upon the natural termination of a previous script element; and changes options to correct/amend a caller's response.

In regards to editing previous scripts in a manner that is transparent to a call handler user. That is, the replaced script will be made available to the user just as a previous script would have been. The script will, however, be updated with a new version number that provides for version control. For example, the prior version of a script will be retained by the call handler system, although not readily available to the user, to provide a baseline in case the new version is deemed inadequate or problematic.

Additionally, if an amended script is referenced by other scripts, the script builder 900 may automatically "migrate" reference to the revised script such that the other scripts now refer to the revised script when called. In this regard, version control is generally strictly controlled at all levels of the script builder 900, protocol, module and element. For example, a first script that references second script may do so by version number. If the second script is amended and thereby updated with a new version number, the first script is automatically updated with the new reference number of the second script so that the first script is able to automatically bridge to the amended second script during a call. This updating of the first script is generally transparent to the call handler user. That is, the update may be performed without intervention by the call handler user. Version control of the scripts also provides a means for call handling quality control by ensuring that retrospective monitoring of call records reveal the user of appropriate script versions. That is, call records will show which version of a script was used during a call.

Additionally, the script builder 900 may be configured to test generated scripts via script builder test control module 906. For example, once a script has been created and/or modified, the user of the script builder system may test the script prior to "publication". Publication generally regards the availability of a script for use by one or more call handler system users. When the test control module 906 is selected, the script builder 900 may display the script under test conditions, but as it would appear to a call handler such that appearance, element navigation, triggers, alert and knowledgebase document displays function as intended. In this regard, the test control module 906 may allow the user to, for example, change the color party value in the initial survey to ensure the correct pre-arrival information is displayed and change the homeland security settings to ensure they function properly. In essence, the script builder test control module 906 operates the script as it would under an operational situation. However, during a test of the script, external triggers do not actually communicate with external systems, such as CAD systems. Nor does testing of the script allow for erroneous records to be inputs into the call handler system.

When a script is tested, the test control module 906 may perform a series of logic tests before displaying the script as it should appear in the call handler. These tests check that business rules have been satisfactorily defined (e.g., the minimum number of tabs exist, for example, primary questions, secondary questions, pre-arrival instructions, call closure, and that the collection of tabs also supports all levels of the homeland security status, etc.). If any part of the test fails, the user may be given reasons for the failure so these can be resolved before further tests are completed. Once the test has satisfactorily concluded, the user may "publish" the script via publication module 907 such that the script may be made available for use within the call handler system.

Additionally, the script builder test control module 906 may cause other components of the call handler system to activate. For example, the script builder test control module 906 may fully test other components based on the testing of a generated script. In this regard, the response advisor 826 of FIG. 8 may respond to triggers that recommend dispatch without actually pushing a dispatch recommendation to a CAD system.

Figure 19:
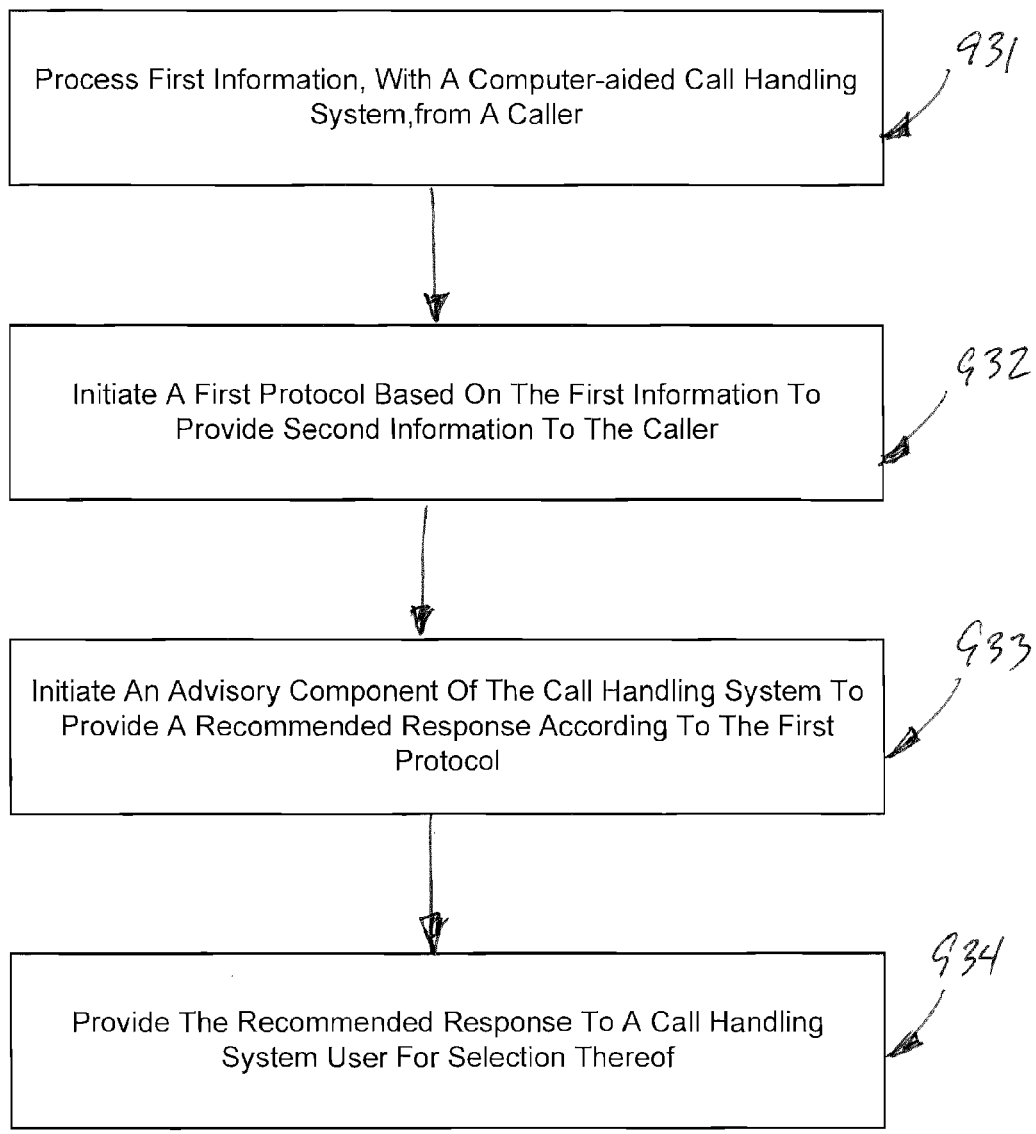
FIG. 19 illustrates a flow chart of a process 930 of a response advisor within a call handling system.

FIG. 19 illustrates a flow chart of a process 930 of a response advisor within a call handling system. Initially, information from a caller is processed with a computer aided call handling system in the process element 931. The first information is determined based on a first response from the caller. For example, the call handling system user may inquire as to the reason why the caller is calling. Based on the caller's response, the call handling system user may input information into the call handling system. This information may be processed to initiate a first protocol in the process element 932. The first protocol provides information to the call handling system user so as to assist the caller. To further assist the caller and the call handling system user, the process 930 also includes initiating an advisory component of the call handling system, in the process element 933. For example, the advisory component may provide a recommended response, such as a dispatch and/or a course of instruction, according to the first protocol (e.g., ambulance dispatch for a heart attack scenario). The process 930, therefore, provides the recommended response to a call handling system user for selection of the recommended response in the process element 934. Other features of the process 930 are shown and described in the response advisor embodiments above herein.

Figure 20:
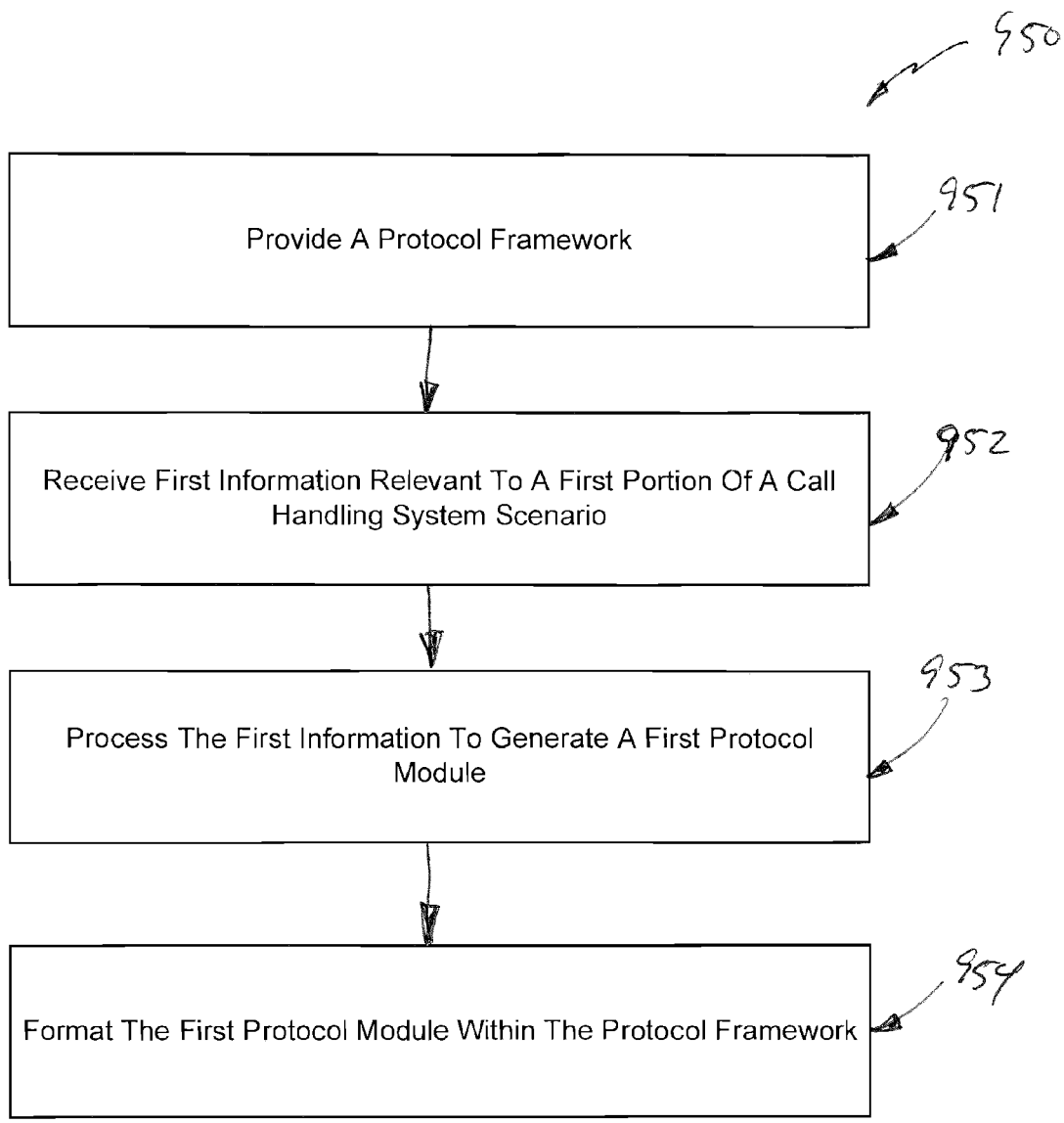
FIG. 20 illustrates a flow chart of a process 950 for building protocols for use within a call handling system.

FIG. 20 illustrates a flow chart of a process 950 for building protocols for use within a call handling system. For example, the process 950 may provide for generating a protocol module used in a call handling system. In this regard, the process 950 may include providing a protocol framework in the process element 951. For example, the protocol framework may provide an administrator of a call handling system with the ability to modularly format protocols that are conducive to a particular call scenario. In this regard, the process 950 may include receiving first information relevant to a first portion of the call handling system scenario, such as questions, statements, and/or instructions that are to be used in a particular protocol for handling the caller scenario (the process element 952). The process 950 also includes processing the first information to generate the first protocol module in the process element 953. This protocol module may be interchangeably used within other protocols. The generated protocol module is then formatted within the protocol framework in the process element 954 to generate the protocol. For example, once all the modules are completed for a particular protocol, the call handling system may compile the protocol framework into a protocol that is published for use for the call handling system. Other features, such as testing and version control of a protocol, are described in the script builder embodiments above herein.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A call handling system, comprising:
 a call handler interface configured for receiving call information from a caller;
 an advisory component communicatively coupled to the call handler interface to detect an event from the call information and generate one or more relative importance indicators based on at least a portion of the call information, wherein the advisory component provides the one or more relative importance indicators to a user of the call handling system via call handler interface;
 a rules processing engine that provides a first protocol to direct the user in assisting the caller with a situation pertaining to the caller; and
 a bridge component formed in the rules processing engine and having a detector that detects an event based on processed call information, the bridge component then initiates at least a second protocol based on a response to a previously initiated protocol.

2. The call handling system of claim 1, wherein the advisory component further provides a selection input to the user for accepting, refusing or amending the relative importance indicator.

3. The call handling system of claim 2, wherein the relative importance indicator includes a risk assessment of a situation pertaining to the caller.

4. The call handling system of claim 2, wherein the relative importance indicator includes a homeland security indicator.

5. The call handling system of claim 1, wherein the protocol includes at least one activity trigger used in initiating the advisory component.

6. The call handling system of claim 1, wherein the advisory component is further configured for receiving input from the user to change a response type.

7. The call handling system of claim 1, wherein the advisory component is communicatively coupled to the rules processing engine to provide activity triggering information to the rules processing engine, wherein the rules processing engine processes the activity triggering information to initiate another protocol.

8. The call handling system of claim 1, wherein the protocol includes one or more script modules, wherein each script module is relevant to a unique caller situation.

9. The call handling system of claim 8, wherein each of the one or more script modules includes one or more script elements, wherein the script elements include questions, statements, or procedures.

10. The call handling system of claim 1, further including a build component that generates one or more script modules.

11. The call handling system of claim 10, wherein the build component includes a test element configured for testing the generated one or more script modules.

12. The call handling system of claim 11, wherein the test element tests the generated one or more script modules by deploying a script module for operation within the call handling system while decoupling the call handling system from external computer aided dispatch systems.

13. The call handling system of claim 10, wherein the build component includes a publication component that provides accessibility to a generated script module by the call handling system.

14. The call handling system of claim 13, wherein the publication component provides version control of a generated script module.

15. The call handling system of claim 14, wherein the build component is configured for migrating the version control of a generated script module to at least one other script module.

16. The call handling system of claim 14, wherein the version control of the generated script module prevents inadvertent access to a previous version of a generated script module.

17. A call handling system, comprising:
 a call handler interface component for receiving call information, wherein the call handling interface component includes a storage unit configured for storing one or more protocols used in directing a call handler to respond to a caller and a processor for processing the call information and populating a database with one or more terms based on the call information, wherein the one or more terms are cross referenced to the stored protocols to initiate at least one of the stored protocols;
 a build component that configures rules that are input via the call handler interface to generate the one or more protocols, wherein the rules include advisory information and a relative importance of a protocol module and wherein a generated protocol has one or more modules configured from the rules;
 a rules processing engine that provides a first protocol that directs assistance to a caller with a situation pertaining to the caller; and
 a bridge component formed in the rules processing engine and having a detector that detects an event based on processed call information, the bridge component then initiating at least a second protocol based on a response to a previously initiated protocol.

18. The call handling system of claim 17, wherein the bridge element operably merges at least two of the stored protocols to generate a merged protocol.

19. A method of providing assistance to a caller, comprising:
 processing first information, with a computer aided call handling system, from a caller, wherein the first information is determined based on a first response from the caller;
 initiating a first protocol based on the first information, wherein the first protocol is configured for providing second information to the caller;
 initiating an advisory component of the call handling system, wherein the advisory component provides a recommended response according to the first protocol;

providing the recommended response to a call handling system user for selection of the recommended response;

providing at least one of a statement, a question, and an instruction upon initiation of the first protocol;

processing third information based on a second response of the caller, wherein the third information is determined from said at least one of the statement, the question, and the instruction;

updating the recommended response based on the third information; and initiating a bridge element based on the third information to initiate a second protocol.

20. The method of claim 19, further comprising providing a dispatch recommendation to either or both of the call handling system user and a computer-aided dispatch system.

21. The method of claim 19, wherein the third information includes a keyword.

22. The method of claim 19, wherein processing the first information includes extracting data from a user interface that includes one or more of: a drop-down menu, a free text entry field, and a keyword selection menu.

* * * * *